US012652127B2

(12) United States Patent  
Cui et al.

(10) Patent No.: US 12,652,127 B2  
(45) Date of Patent: Jun. 9, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Shengjiang Cui, Dongguan (CN); Weijie Xu, Dongguan (CN); Zhisong Zuo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 388 days.

(21) Appl. No.: 18/239,705

(22) Filed: Aug. 29, 2023

(65) Prior Publication Data

US 2023/0412308 A1    Dec. 21, 2023

Related U.S. Application Data

(63) Continuation of application No. PCT/CN2021/093174, filed on May 11, 2021.

(51) Int. Cl.  
H04L 1/1607 (2023.01)  
H04L 1/00 (2006.01)  
H04L 1/1867 (2023.01)

(52) U.S. Cl.  
CPC .......... H04L 1/1642 (2013.01); H04L 1/0067 (2013.01); H04L 1/1874 (2013.01)

(58) Field of Classification Search  
CPC ... H04L 1/1874; H04L 1/0067; H04L 1/0061; H04L 1/0057; H04L 1/0013; H04L 1/1819; H04L 1/1642  
See application file for complete search history.

(56) References Cited

U.S. PATENT DOCUMENTS

2019/0356341 A1* 11/2019 Ma ...................... H03M 13/271  
2020/0228254 A1* 7/2020 Ma ........................ H04L 1/1819  
(Continued)

FOREIGN PATENT DOCUMENTS

AU        2018214850 A1 * 9/2019 .......... H03M 13/116  
CN        101227259 A    7/2008  
(Continued)

OTHER PUBLICATIONS

Qualcomm Inc. "TB Processing over Multi-slot PUSCH" 3GPP TSG-RAN WG1 Meeting #104bis R1-2103179, Apr. 20, 2021 (Apr. 20, 2021), section 2, 8 pages.  
(Continued)

*Primary Examiner* — Phong La  
(74) *Attorney, Agent, or Firm* — BAYES PLLC

(57) ABSTRACT

Provided is a wireless communication method. A terminal device acquires a first bit sequence of a target transport block after being encoded, the target transport block being transmitted based on a plurality of time domain unit sets; inputs the first bit sequence into a circular buffer. The terminal device reads a plurality of second bit sequences from the circular buffer based on at least one redundancy version (RV) and at least one position offset factor, wherein the at least one RV corresponds to at least one of the plurality of time domain unit sets, and the plurality of time domain unit sets or the at least one RV corresponds to the at least one position offset factor. The terminal device sends the plurality of second bit sequences respectively through the plurality of time domain unit sets to a network device.

11 Claims, 15 Drawing Sheets

(56) References Cited

U.S. PATENT DOCUMENTS

| | | | | |
|---|---|---|---|---|
| 2021/0067266 A1* | 3/2021 | Ahn | | H04L 1/08 |
| 2021/0135787 A1* | 5/2021 | Sengupta | | H04L 5/0082 |
| 2023/0412308 A1* | 12/2023 | Cui | | H04L 1/1874 |

FOREIGN PATENT DOCUMENTS

| | | | | | |
|---|---|---|---|---|---|
| CN | 108023675 A | * | 5/2018 | | H04L 1/1806 |
| CN | 112073160 A | | 12/2020 | | |
| CN | 108270525 B | * | 2/2021 | | H04L 1/1819 |
| EP | 3923663 A1 | | 12/2021 | | |
| WO | WO-2013135022 A1 | * | 9/2013 | | H04L 1/0041 |
| WO | WO-2018230701 A1 | * | 12/2018 | | H04L 27/26 |
| WO | WO-2018233635 A1 | * | 12/2018 | | H04W 72/0446 |
| WO | 2020204497 A1 | | 10/2020 | | |

OTHER PUBLICATIONS

OPPO. "Issues for TB over multi-slot PUSCH", 3GPP TSG RAN WG1 #104-e R1-2102408, Apr. 20, 2021 (Apr. 20, 2021), entire document, 7 pages.

International Search Report in the international application No. PCT/CN2021/093174, mailed on Feb. 10, 2022, 5 pages with English translation.

English translation of the Written Opinion of the International Search Authority in the international application No. PCT/CN2021/093174, mailed on Feb. 10, 2022, 8 pages with English translation.

"3rd Generation Partnership Project; Technical Specification Group Radio Access Network; NR; Physical layer procedures for data (Release 16)", 3GPP TS 38.214 V16.3.0 (Sep. 2020), cited in 6.1.2 Resource allocation in time domain, 165 pages.

"3rd Generation Partnership Project; Technical Specification Group Radio Access Network; NR; Multiplexing and channel coding (Release 16)", 3GPP TS 38.212 V16.3.0 (Sep. 2020), cited in 5.4.2 Rate matching for LDPC code, 147 pages.

"RAN1 Chair's Notes", 3GPP TSG RAN WG1 Meeting #104b-e, e-Meeting, Apr. 12-20, 2021, cited in 8.8.1.2 TB processing over multi-slot PUSCH, 128 pages.

Nokia et al: "Transport block processing for PUSCH coverage enhancements", 3GPP Draft; R1-2103381, 3rd Generation Partnership Project (3GPP), Mobile Competence Centre; 650, Route Des Lucioles; F-06921 Sophia-Antipolis Cedex; France, vol. RAN WG1, No. e-Meeting; Apr. 12, 2021-Apr. 20, 2021, Apr. 7, 2021 (Apr. 7, 2021), XP052178123, section 2.3; p. 6-p. 7; figures 3, 4. 9 pages.

Huawei et al: "Discussion on TB processing over multi-slot PUSCH", 3GPP Draft; R1-2102314, 3rd Generation Partnership Project (3GPP), Mobile Competence Centre; 650, Route Des Lucioles; F-06921 Sophia-Antipolis Cedex; France, vol. RAN WG1, No. E-meeting; Apr. 12, 2021-Apr. 20, 2021, Apr. 7, 2021 (Apr. 7, 2021), XP052177034, section 2.3.3; p. 5-p. 6; figures 2-3. 8 pages.

Supplementary European Search Report in the European application No. 21941294.7, mailed on Mar. 5, 2024. 10 pages.

* cited by examiner

100

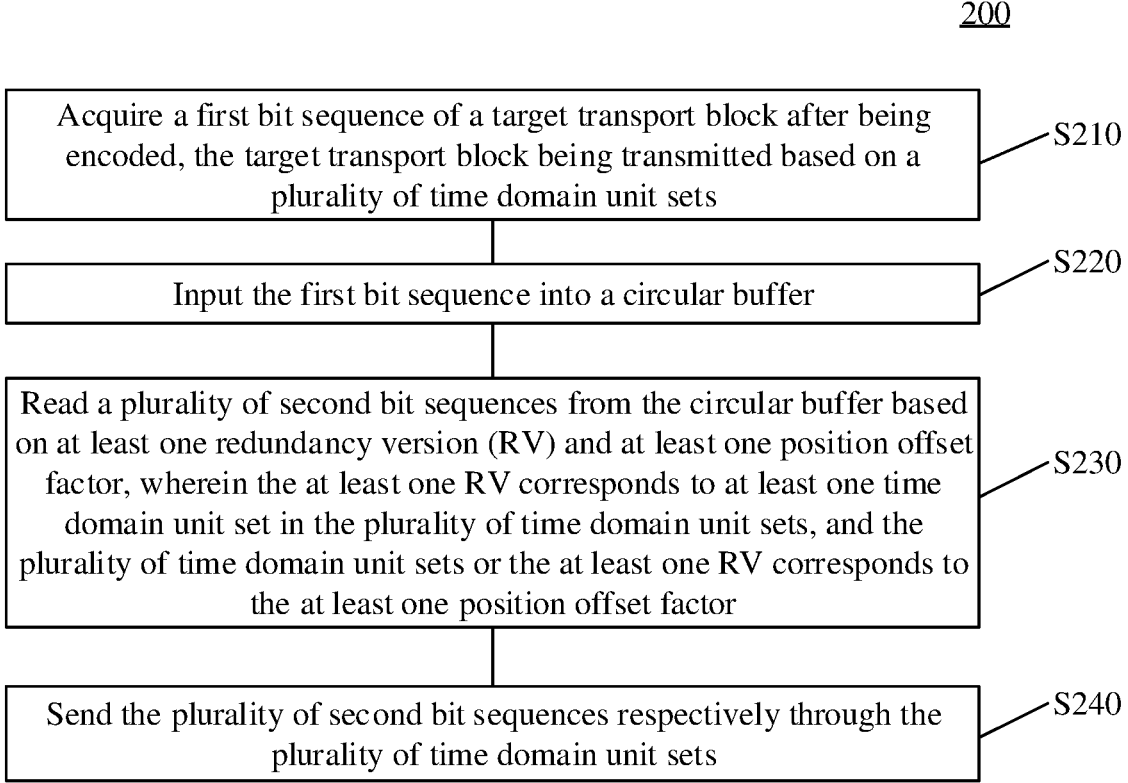

200

| | |
|---|---|
| Acquire a first bit sequence of a target transport block after being encoded, the target transport block being transmitted based on a plurality of time domain unit sets | S210 |
| Input the first bit sequence into a circular buffer | S220 |
| Read a plurality of second bit sequences from the circular buffer based on at least one redundancy version (RV) and at least one position offset factor, wherein the at least one RV corresponds to at least one time domain unit set in the plurality of time domain unit sets, and the plurality of time domain unit sets or the at least one RV corresponds to the at least one position offset factor | S230 |
| Send the plurality of second bit sequences respectively through the plurality of time domain unit sets | S240 |

FIG. 4

U  Uplink slot          D  Downlink slot          S  Special slot

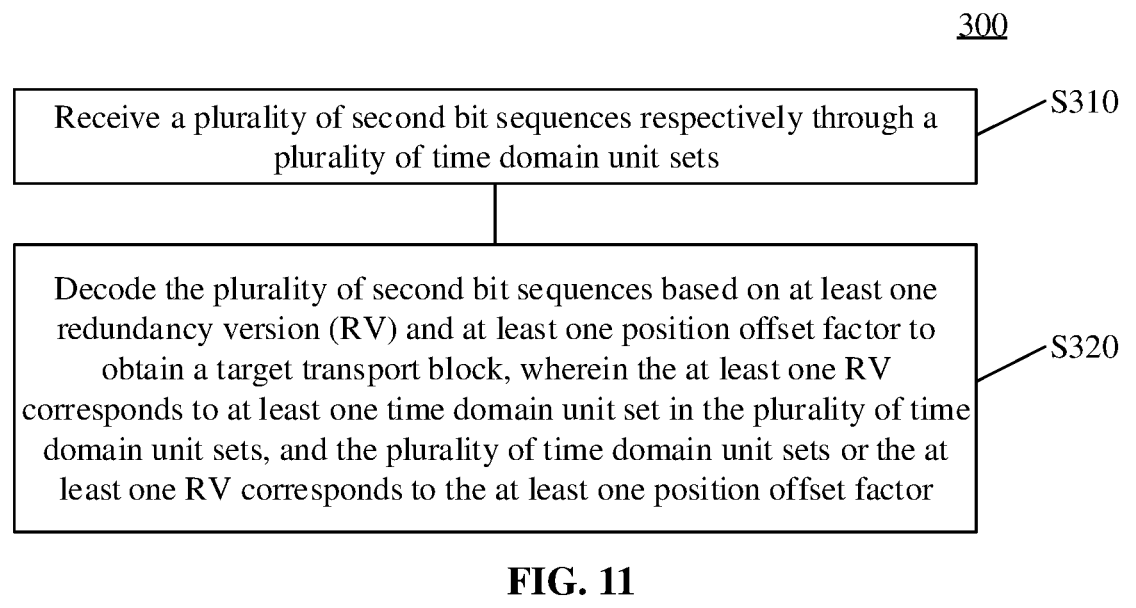

300

| | |
|---|---|
| Receive a plurality of second bit sequences respectively through a plurality of time domain unit sets | S310 |

| | |
|---|---|
| Decode the plurality of second bit sequences based on at least one redundancy version (RV) and at least one position offset factor to obtain a target transport block, wherein the at least one RV corresponds to at least one time domain unit set in the plurality of time domain unit sets, and the plurality of time domain unit sets or the at least one RV corresponds to the at least one position offset factor | S320 |

FIG. 11

WIRELESS COMMUNICATION METHOD, TERMINAL DEVICE AND NETWORK DEVICE

CROSS-REFERENCE TO RELATED APPLICATION

This application is a continuation of International Patent Application No. PCT/CN2021/093174 filed on May 11, 2021, the disclosure of which is hereby incorporated by reference in its entirety.

BACKGROUND

Up to now, the number of repetitions of repeated transmission of Physical Uplink Shared Channel (PUSCH) is semi-statically configured, and when the PUSCH repeated transmission is used in conjunction with flexible slot structures, PUSCH repetitions in some slots will be ignored. Therefore, in some configurations, especially in the case of Time Division Duplexing (TDD), the configured number of repetitions cannot achieve a desired coverage enhancement effect.

In addition, in release 17 (R17) of the 3rd Generation Partnership Project (3GPP), when considering the repeated transmission of the PUSCH, a TB processing over multi-slot (TBoMS) will be introduced. That is, a Transport Block Size (TBS) is determined based on multiple slots, or a Transport Block (TB) is transmitted on multiple slots. However, for a rate matching mechanism of R15/R16, Type A-based PUSCH repeated transmission performs a rate matching processing on each slot based on a redundancy version (RV). If the rate matching is performed on the transport block in the TboMS according to the rate matching mechanism of R15/R16, when the rate matching is performed on each slot based on one RV, because the TBS is determined based on multiple slots, system bits corresponding to RV0 and/or RV1 may be lost, which degrades decoding performance. For example, when there are not enough symbols available for uplink transmission in a slot to transmit bit sequences corresponding to an RV, the system bits corresponding to the RV0 and/or the RV1 may be lost, which degrades decoding performance.

Therefore, there is an urgent need in the art for a method of rate matching for a transport block in the TboMS.

SUMMARY

Embodiments of the present disclosure relate to the field of communications, and more particularly, to a wireless communication method, a terminal device and a network device.

Embodiments of the present disclosure provide a wireless communication method, a terminal device and a network device, which can not only realize rate matching for a transport block in TboMS, but also avoid losing system bits corresponding to RV0 and/or RV1, so as to improve decoding performance for sequences after rate matching.

In a first aspect, the present disclosure provides a wireless communication method, which includes following operations. A first bit sequence of a target transport block after being encoded is acquired. The target transport block is transmitted based on a plurality of time domain unit sets. The first bit sequence is inputted into a circular buffer. A plurality of second bit sequences are read from the circular buffer based on at least one redundancy version (RV) and at least one position offset factor. The at least one RV corresponds to at least one time domain unit set in the plurality of time domain unit sets, and the plurality of time domain unit sets or the at least one RV corresponds to the at least one position offset factor. The plurality of second bit sequences are sent respectively through the plurality of time domain unit sets.

In a second aspect, the present disclosure provides a wireless communication method, which includes following operations. A plurality of second bit sequences are received respectively through a plurality of time domain unit sets. The plurality of second bit sequences are decoded based on at least one redundancy version (RV) and at least one position offset factor to obtain a target transport block. The at least one RV corresponds to at least one time domain unit set in the plurality of time domain unit sets, and the plurality of time domain unit sets or the at least one RV corresponds to the at least one position offset factor.

In a third aspect, the present disclosure provides a terminal device including a processor and a transceiver. The processor and the transceiver cooperate with each other to perform the method in the first aspect.

In a fourth aspect, the present disclosure provides a network device including a processor and a transceiver. The processor and the transceiver cooperate with each other to perform the method in the second aspect.

BRIEF DESCRIPTION OF THE DRAWINGS

FIG. 4 is a schematic flowchart of a wireless communication method provided by an embodiment of the present disclosure.

FIG. 11 is another schematic flowchart of a wireless communication method provided by an embodiment of the present disclosure.

DETAILED DESCRIPTION

Technical solutions of embodiments of the present disclosure will be described below in conjunction with the accompanying drawings in the embodiments of the present disclosure. It will be apparent that the described embodiments are part of the embodiments of the present disclosure, but not all of the embodiments of the present disclosure. Based on the embodiments in the present disclosure, all other embodiments obtained by those of ordinary skill in the art without making creative efforts fall within the scope of protection of the present disclosure.

Figure 1:
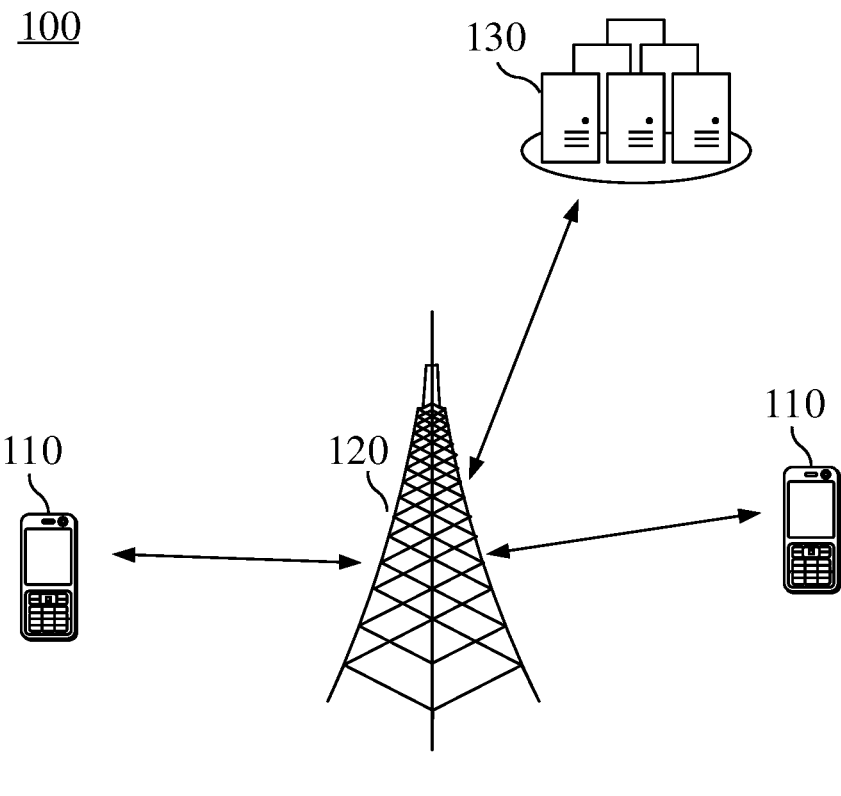
FIG. 1 is an example of a system framework provided by an embodiment of the present disclosure.

FIG. 1 is a schematic diagram of a system framework of an embodiment of the present disclosure.

As shown in FIG. 1, a communication system 100 may include terminal devices 110 and a network device 120. The network device 120 may communicate with the terminal devices 110 through an air interface. Multi-service transmission is supported between the terminal devices 110 and the network device 120.

It should be understood that in the embodiments of the present disclosure, the communication system 100 is used for illustration, but the embodiments of the present disclosure are not limited thereto. That is, the technical solutions of the embodiments of the present disclosure can be applied to various communication systems, such as: a Long Term Evolution (LTE) system, a LTE Time Division Duplex (TDD) system, a Universal Mobile Telecommunications System (UMTS), an Internet of Things (IoT) system, a Narrow Band Internet of Things (NB-IoT) system, an enhanced Machine-Type Communications (eMTC) system, a 5G communication system (also called New Radio (NR) communication system), or a future communication system, etc.

In the communication system 100 shown in FIG. 1, the network device 120 may be an access network device that communicates with the terminal devices 110. The access network device may provide communication coverage for a particular geographic area and may communicate with the terminal devices 110 (e.g., UE) located within the coverage area.

The network device 120 may be an Evolutional Node B (eNB or eNodeB) in a Long Term Evolution (LTE) system, a Next Generation Radio Access Network (NG RAN) device, a base station (gNB) in an NR system, or a wireless controller in a Cloud Radio Access Network (CRAN). Alternatively, the network device 120 may be a relay station, an access point, a vehicle-mounted device, a wearable device, a hub, a switch, a bridge, a router, or a network device in a future evolved Public Land Mobile Network (PLMN), etc.

The terminal device 110 may be any terminal device including, but being not limited to, a terminal device in wired or wireless connection with the network device 120 or other terminal devices.

For example, the terminal device 110 may refer to an access terminal, User Equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5G network or a terminal device in a future evolution network, etc.

Device to Device (D2D) communication may be performed between the terminal devices 110.

The wireless communication system 100 may further include a core network device 130 that communicates with the base station. The core network device 130 may be a 5G Core (5GC) device, for example, an Access and Mobility Management Function (AMF), for another example, an Authentication Server Function (AUSF), for another example, a User Plane Function (UPF), and for another example, a Session Management Function (SMF). Alternatively, the core network device 130 may also be an Evolved Packet Core (EPC) device of the LTE network, for example, a Session Management Function plus Core Packet Gateway (SMF+PGW-C) device. It should be understood that SMF+PGW-C can achieve functions that can be achieved by both SMF and PGW-C. In the evolution of network, the core network device may also be called by other names, or a new network entity may be formed by dividing the functions of the core network, which is not limited by the embodiments of the present disclosure.

Various functional units in the communication system 100 may further realize communication by establishing connections through a next generation (NG) interface.

For example, the terminal device establishes an air interface connection with the access network device through an NR interface for transmitting user plane data and control plane signaling. The terminal device can establish a control plane signaling connection with an AMF through an NG interface 1 (abbreviated as N1). The access network device, such as a next generation radio access base station (gNB), may establish a user plane data connection with a UPF through an NG interface 3 (abbreviated as N3). The access network device can establish a control plane signaling connection with the AMF through an NG interface 2 (abbreviated as N2). The UPF can establish a control plane signaling connection with an SMF through an NG interface 4 (abbreviated as N4). The UPF can exchange user plane data with a data network through an NG interface 6 (abbreviated as N6). The AMF can establish a control plane signaling connection with the SMF through an NG interface 11 (abbreviated as N11). The SMF can establish a control plane signaling connection with a Policy Control Function (PCF) through an NG interface 7 (abbreviated as N7).

FIG. 1 exemplarily illustrates one base station, one core network device and two terminal devices. Alternatively, the wireless communication system 100 may include a plurality of base station devices and other numbers of terminal devices may be included within the coverage area of each base station, which is not limited by embodiments of the present disclosure.

It should be understood that devices having communication functions in the network/system in the embodiments of the present disclosure may all be referred to as communication devices. Taking the communication system 100 shown in FIG. 1 as an example, the communication device may include the network device 120 and the terminal devices 110 that have a communication function. The network device 120 and the terminal devices 110 may be devices described above and will not be repeated herein for the sake of brevity. The communication device may further include other devices in the communication system 100, such as network controllers, mobility management entities and other network entities, which are not limited in the embodiments of the present disclosure.

It should be understood that the terms "system" and "network" are often used interchangeably herein. In this context, the term "and/or" is merely an association relationship that describes associated objects, which means that there may be three relationships. For example, "A and/or B" may have three meanings: A exists alone, A and B exist at the same time and B exists alone. In addition, the character "/" herein generally indicates that the associated objects before and after the character "/" are in an "or" relationship.

In order to enhance the reliability of uplink transmission, NR R15 introduces slot aggregated Physical Uplink Share Channel (PUSCH) repeated transmission. The slot aggregated PUSCH repeated transmission means that the same transport block is repeatedly transmitted K times with different redundancy versions (RV). A base station configures the number of repetitions K for a terminal device by using a higher layer parameter, i.e., PUSCH-AggregationFactor. The terminal repeatedly transmits the same transport block over K consecutive slots, and a PUSCH replica bearing the transport block in each slot occupies the same symbol in the time domain. RV of the first PUSCH replica is indicated by the uplink grant signaling, and RVs of the remaining PUSCH replicas are cycled in an order of $\{0, 2, 3, 1\}$. The transmission of RV will be explained with reference to Table 1.

TABLE 1

| $RV_{id}$ indicated by DCI for scheduling PUSCH | $RV_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

As shown in Table 1, the terminal can achieve rate matching for the transport block through a circular buffer. That is, the terminal can store encoded bits in the circular buffer, and read the encoded bits sequentially from the circular buffer according to the RV at each time of transmission, so as to realize the rate matching. In other words, for each transmission, a reading position for the rate matching is determined by the RV, or the RV may be used to indicate from which position of this buffer the data is extracted. As an example, it is assumed that four RVs including $RV_0$, $RV_1$, $RV_2$, and $RV_3$ are preset in the circular buffer. The selection order of these four RVs is [0, 2, 3, 1]. That is, the $RV_0$ is taken as a starting position for the first transmission, the $RV_2$ is taken as a starting position for the second transmission, the $RV_3$ is taken as a starting position for the third transmission, and the $RV_1$ is taken as a starting position for the fourth transmission. The first transmission refers to the initial transmission of data, and the second transmission, third transmission and fourth transmission are retransmission of the data. The order of 0, 2, 3, 1 is a typical selection sequence of RVs when transmitting data in LTE/NR. The 0, 2, 3 and 1 are values corresponding to the first RV ($RV_0$), the third RV ($RV_2$), the fourth RV ($RV_3$) and the second RV ($RV_1$), respectively.

If there is at least one semi-static downlink symbol in a time domain resource corresponding to a PUSCH replica in a slot, the PUSCH in the slot will not be sent.

Figure 2:
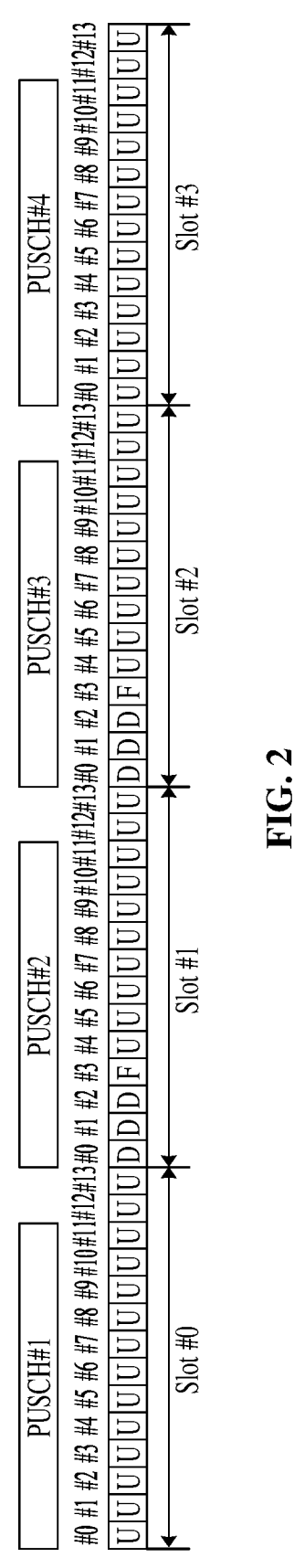
FIG. 2 is a schematic diagram of slot aggregated PUSCH repeated transmission provided by an embodiment of the present disclosure.

FIG. 2 is a schematic diagram of slot aggregated PUSCH repeated transmission provided by an embodiment of the present disclosure.

As shown in FIG. 2, the base station configures the terminal to repeatedly send a transport block four times, and a PUSCH replica occupies symbols #0 to #11 in each slot. However, since the symbols #0 to #2 in a slot #1 and in a slot #2 are semi-static downlink symbols, the second PUSCH repetition to be sent on the slot #1 and the third PUSCH repetition to be sent in the slot #2 are discarded and not sent.

For slot aggregated PUSCH repetition for uplink grant-free scheduling, the number of repetitions of a transport block is configured by a higher layer parameter RepK.

Schemes of PUSCH enhancement include Type B-based PUSCH repeated transmission and Type A-based PUSCH repeated transmission.

For Type B-based PUSCH repeated transmission, a base station sends an uplink grant or grant-free indication to indicate one or more nominal PUSCH repeated transmissions. A terminal transmits one or more actual PUSCH replicas in one slot or transmits two or more actual PUSCH replicas in multiple consecutive available slots. The base station adds a column called numberofrepetition in a Time Domain Resource Allocation (TDRA) table to indicate the number of replicas for Type B-based PUSCH repeated transmission, and the value of the numberofrepetition can be $\{1, 2, 3, 4, 7, 8, 12, 16\}$. The uplink scheduling signaling or the first type of grant-free configuration information indicates a starting symbol S and a duration L of the first nominal PUSCH replica, and the duration L of each nominal PUSCH replica is the same, where $0 \leq S \leq 13$, $1 \leq L \leq 14$. The higher layer signaling indicates each of S and L by using 4 bits respectively, allowing S+L>14. The transport block size (TBS) of the nominal PUSCH replica and the actual PUSCH replica is determined based on the time domain length L of the nominal PUSCH replica. Starting with the second nominal PUSCH replica, a starting symbol of the nominal PUSCH replica is next symbol to an end symbol of the previous nominal PUSCH replica.

Before determining time domain resources of the actual PUSCH replica, the terminal needs to determine an invalid symbol(s), and remaining symbols are considered as potentially valid symbols. If the number of consecutive potentially valid symbols for a nominal PUSCH replica in a slot is greater than 0, an actual PUSCH replica can be mapped, and time domain resources of one nominal PUSCH replica may include time domain resources of one or more actual PUSCH replicas. The terminal does not send an actual PUSCH replica of a single symbol unless the single symbol is the duration L of the nominal PUSCH indicated by the base station.

Figure 3:
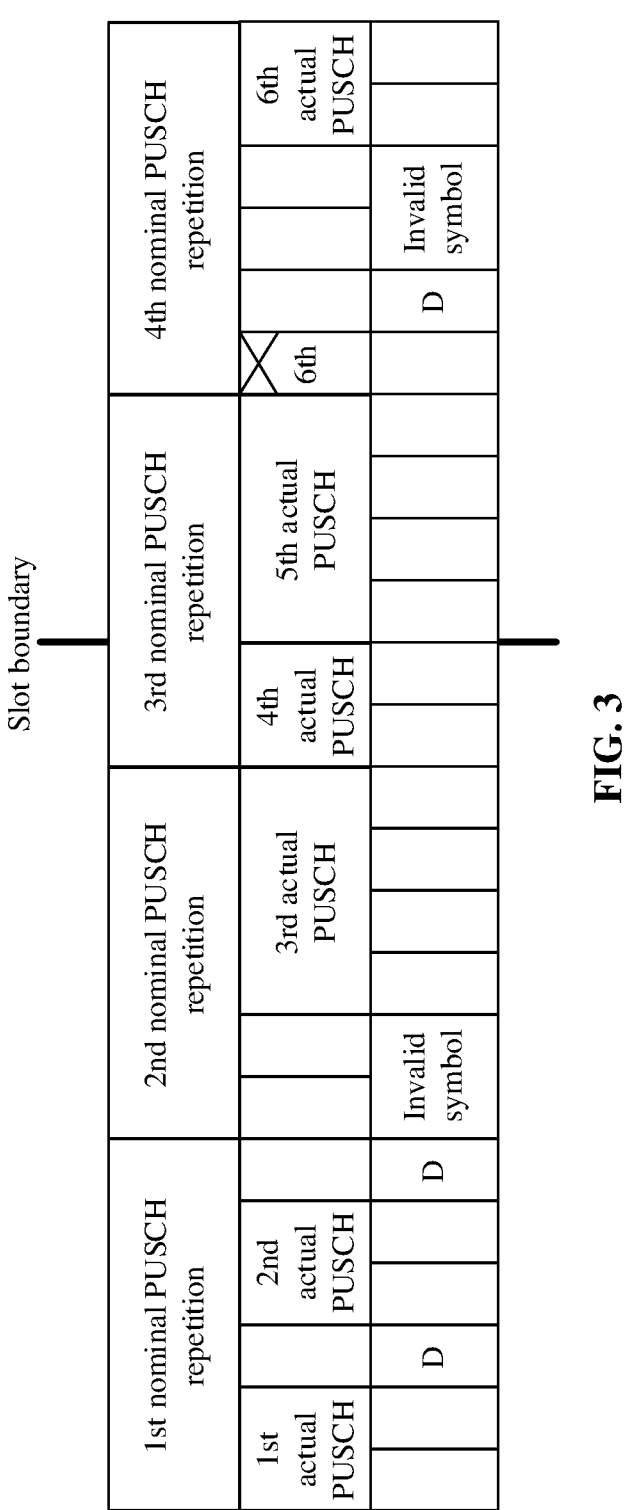
FIG. 3 is a diagram of time domain resources of Type B-based PUSCH repeated transmission provided by an embodiment of the present disclosure.

FIG. 3 is a diagram of time domain resources of Type B-based PUSCH repeated transmission provided by an embodiment of the present disclosure.

As shown in FIG. 3, a base station sends an uplink grant or a grant-free indicating four nominal PUSCH repeated transmissions, and each nominal PUSCH replica has a duration L equal to 4. Time domain resources of the first nominal PUSCH replica may include time domain resources of two actual PUSCH replicas (i.e., the first actual PUSCH and the second actual PUSCH). Time domain resources of the second nominal PUSCH replica may include time domain resources of one actual PUSCH replica (i.e., the third actual PUSCH). Time domain resources of the third nominal PUSCH replica may include time domain resources of two actual PUSCH replicas (i.e., the fourth actual PUSCH and the fifth actual PUSCH). Time domain resources of the fourth nominal PUSCH replica may include time domain resources of two actual PUSCH replicas, and however, since the time domain resource of the earlier actual PUSCH replica is one symbol, the actual PUSCH replica is not sent, and only the later actual PUSCH replica (i.e., the sixth actual PUSCH) is sent.

In some implementations, the terminal may determine the invalid symbol in at least one of the following manners.
First Manner:

A downlink symbol that is semi-statically configured by a higher layer parameter tdd-UL-DL-ConfigurationCommon or tdd-UL-DL-Configuration Dedicated is an invalid symbol.
Second Manner:

A symbol-level Bitmap is configured by a higher layer parameter InvalidSymbolPattern, and a bit value of 1 indicates that the corresponding symbol(s) is an invalid symbol. When DCI format 0_1 or DCI format 0_2 are used to schedule the PUSCH repetition, or activate the second type grant-free PUSCH repetition, and 1 bit of indication information field for invalid symbol pattern is configured in DCI, if the indication information field for the invalid symbol pattern is set to 1, the terminal applies the invalid symbol pattern, otherwise, the terminal does not apply the invalid symbol pattern. If the DCI does not contain the indication information field for the invalid symbol pattern, the terminal directly applies the invalid symbol pattern according to the configuration of the higher layer parameter InvalidSymbol-Pattern. Different DCI formats are used to independently configure the indication information fields for invalid symbol patterns.

For Type A-based PUSCH repeated transmission, a base station can add a column numberofrepetitions in the TDRA table configured by higher layer signaling, and the numberofrepetitions is used to indicate the number of repetitions K of Type A-based PUSCH repeated transmissions. If numberofrepetitions is not configured, the number of repetitions K is determined by a higher layer parameter pusch-AggregationFactor. If neither the numberofrepetitions nor pusch-AggregationFactor parameters is configured, the number of repetitions K is equal to 1. The Type A-based PUSCH repeated transmission means that the user sends the same transport block (TB) on K consecutive slots, and the symbol positions occupied in the K slots are exactly the same (that is, both the starting symbol position and the occupied symbol length are the same). Similar to Hybrid Automatic Repeat Request (HARQ) retransmission, the PUSCH repeated transmission can be regarded as retransmission of information. The difference between the HARQ retransmission and the PUSCH repeated transmission is that retransmission is triggered only when Negative Acknowledgement (NACK) is received for HARQ, while PUSCH can be directly retransmitted K times after configuration of PUSCH repetition completes. A version number of the first transmission can be determined according to indication information in the Downlink Control Information (DCI) field, the indication information occupying two bits, and the version number of the subsequent RVs circulates in an order of 0, 2, 3 and 1. For example, when DCI indicates that the version number of the first transmission is 2, then the following version numbers are 3, 1, 0, 2, . . . .

For grant-free PUSCH repetition, when a higher layer parameter PUSCHRepTypeIndicatorForType1Configuredgrant is configured as PUSCH-RepTypeB, it indicates that it is a Type B-based PUSCH repetition, otherwise it is a Type A PUSCH repetition. If the numberofrepetitions exists in the TDRA table, the number of nominal repetitions of repeated transmission of PUSCH is determined by a row in the TDRA table, otherwise the number of repetitions is determined by the higher layer parameter RepK.

The number of repetitions of repeated transmission of PUSCH is semi-statically configured, and when the PUSCH repeated transmission is used in conjunction with flexible slot structures, the repetitions of some slots will be ignored. Therefore, in some configurations, especially in the case of Time Division Duplexing (TDD), the configured number of repetitions cannot achieve a desired coverage enhancement effect.

In addition, in release 17 (R17) of the 3rd Generation Partnership Project (3GPP), when considering the repeated transmission of the PUSCH, a TB processing over multi-slot (TBoMS) will be introduced. That is, a Transport Block Size (TBS) is determined based on multiple slots, or a Transport Block (TB) is transmitted on multiple slots. However, for a rate matching mechanism of R15/R16, Type A-based PUSCH repeated transmission performs a rate matching processing on each slot based on a redundancy version (RV). If the rate matching is performed on the transport block in the TboMS according to the rate matching mechanism of R15/R16, when the rate matching is performed on each slot based on one RV, because the TBS is determined based on multiple slots, system bits corresponding to RV0 and/or RV1 may be lost, which degrades decoding performance. For example, when there are not enough symbols available for uplink transmission in a slot to transmit bit sequences corresponding to an RV, the system bits corresponding to the RV0 and/or the RV1 may be lost, which degrades decoding performance.

Based on this, embodiments of the present disclosure provides a wireless communication method, a terminal device and a network device, which can not only realize rate matching for the transport block in the TboMS, but also avoid losing the system bits corresponding to the RV0 and/or the RV1, so as to improve decoding performance for sequences after rate matching.

To facilitate understanding of the solutions provided by the present disclosure, the following describes an encoding procedure of a Low Density Parity Check Code (LDPC) code.

In an encoding procedure of the LDPC code, after receiving a transport block from a Media Access Control (MAC) layer, a physical layer first adds a (16 or 24 bits) Cyclic Redundancy Check (CRC) to the transport block. After adding the CRC, if the number of bits contained in the transport block exceeds a certain value, the transport block needs to be divided into two or more code blocks with the same length. Each code block is added with the CRC. Then, LDPC encoding is independently performed on each code block with CRC added. Then, each encoded code block is subjected to rate matching, HARQ processing and interleaving respectively. CRC is a channel coding technology that generates a short check code with fixed number of bits according to network data packets or computer file. The CRC is mainly used to detect or check errors that may occur after data transmission or storage. It uses the principle of division and remainder to detect errors. Specifically, the CRC forms an n-bit transmission frame T by adding (n-k) bit redundant bits, i.e., Frame Check Sequence (FCS), after the k bits of data D to be transmitted. Rate matching means that bits on the transmission channel are repeated, zero-padded or punctured to match the bearer capabilities of the physical channel, so as to reach the bit rate required by the transmission format when performing the channel mapping. In the rate matching, if the number of input bits is less than the number of output bits, repetition or zero-bit padding is used; and if the number of input bits is more than the number of output bits, puncturing is used. Puncturing means that some bits are cancelled according to a certain pattern. That is, some bits are removed or cancelled from the bit sequence, and subsequent bits are moved forward one bit in turn. The repetition is to insert the current bit once between the current bit and the subsequent bit. The zero-bit padding is to insert zero bits between the current bit and the subsequent bit. On the contrary, the rate de-matching algorithm enables to restore the cancelled bits or cancel the repeated/zero-padded bits.

In the rate matching process, the encoded bit sequence can be represented by $d_0$, $d_1$, $d_2$, . . . $d_{N-1}$ (N is a length of the encoded sequence), and the sequence will be input into a circular buffer with a length of $N_{cb}$. $E_r$ represents the length of the output sequence of the r-th code block after rate matching.

In an implementation, a determination process of $E_r$ can be implemented by the following code:

```
Set j = 0;
For r = 0 to C − 1
    if the r-th code block is not scheduled by CBGTI
        E_r = 0;
    else
    if j ≤ C' − mod (G/(N_L · Q_m), C') − 1;

E_r = N_L · Q_m · ⌊ G / (N_L · Q_m · C') ⌋;

else

E_r = N_L · Q_m · ⌈ G / (N_L · Q_m · C') ⌉;

end if
    j = j + 1;
        end if
    end if
```

The $N_L$ is the number of transmission layers that the transport block is mapped onto; $Q_m$ is the modulation order; and G is the total number of encoded bits available for transmission of the transport block. If CBGTI is not present in the DCI scheduling the transport block, then C'=C; and if CBGTI is present in the DCI scheduling the transport block, C' is the number of scheduled code blocks of the transport block.

The redundancy version number of the transmission can be denoted by $rv_{id}$, ($rv_{id}$=0, 1, 2, or 3), and the output sequence after rate matching is denoted by $e_k$, k=0, 1, 2, . . . , E−1. The first bit $k_0$ in the output sequence after rate matching is associated with $rv_{id}$ and a Base Graph (BG) of the LDPC. The BG is the core of the whole LDPC code design. Each TB code block needs to be encoded by an LDPC base graph 1 or an LDPC base graph 2. The relationship between the LDPC base graphs and $rv_{id}$ is explained below in conjunction with Table 2.

TABLE 2

| $rv_{id}$ | $k_0$ | |
| | LDPC base graph 1 | LDPC base graph 2 |
| --- | --- | --- |
| 0 | 0 | 0 |

TABLE 2-continued

| $rv_{id}$ | $k_0$ | |
| | LDPC base graph 1 | LDPC base graph 2 |
| --- | --- | --- |
| 1 | $\left\lfloor \dfrac{17 N_{cb}}{66 Z_c} \right\rfloor Z_c$ | $\left\lfloor \dfrac{13 N_{cb}}{50 Z_c} \right\rfloor Z_c$ |
| 2 | $\left\lfloor \dfrac{33 N_{cb}}{66 Z_c} \right\rfloor Z_c$ | $\left\lfloor \dfrac{25 N_{cb}}{50 Z_c} \right\rfloor Z_c$ |
| 3 | $\left\lfloor \dfrac{56 N_{cb}}{66 Z_c} \right\rfloor Z_c$ | $\left\lfloor \dfrac{43 N_{cb}}{50 Z_c} \right\rfloor Z_c$ |

As shown in table 2, for an RV with an identifier of 0, its corresponding LDPC base graph 1 and corresponding LDPC base graph 2 are both 0, and for an RV an identifier of 1, 2 or 3, each of which may correspond to one LDPC base graph 1 and one LDPC base graph 2.

In an implementation, the output sequence $e_k$ after rate matching may be implemented by the following code:

```
k=0;
j=0;
while k<E
    if d_((k_0+j)modN_cb) ≠< NULL >
        e_k = d_((k_0+j)modN_cb);
        k=k+1;
    end if
    j=j+1;
end while
```

Encoded bits obtained by rate matching are interleaved and then modulated, that is, bit-interleaved coded modulation, which is used to ensure the performance stability of the LDPC code in high-order modulation and fading channels. A bit sequence $e_0$, $e_1$, $e_2$, . . . , $e_{E-1}$ is obtained by bit selection, the bit sequence needs to be interleaved, and a sequence $f_0$, $f_1$, $f_2$, . . . , $f_{E-1}$ is obtained after interleaving.

In an implementation, bit interleaving can be implemented by the following code:

```
for j = 0 to E/Q_m − 1
    for i = 0 to Q_m − 1
        f_(i+j·Q_m) = e_(i·E/Q_m+j);
    end for
end for
```

The wireless communication method provided by the present disclosure is described below.

FIG. 4 shows a schematic flowchart of a wireless communication method 200 according to an embodiment of the present disclosure. The method 200 can be performed by the terminal device. For example, The method 200 can be performed by the terminal device shown in FIG. 1.

As shown in FIG. 4, the method 200 may include following operations.

In S210, a first bit sequence of a target transport block after being encoded is acquired. The target transport block is transmitted based on a plurality of time domain unit sets.

In S220, the first bit sequence is inputted into a circular buffer.

In S230, a plurality of second bit sequences are read from the circular buffer based on at least one redundancy version (RV) and at least one position offset factor. The at least one RV corresponds to at least one time domain unit set in the plurality of time domain unit sets, and the plurality of time domain unit sets or the at least one RV corresponds to the at least one position offset factor.

In S240, the plurality of second bit sequences are sent respectively through the plurality of time domain unit sets.

In other words, the present disclosure provides a method for data reading of circular buffer based rate matching. That is, at least one position offset factor is introduced for the plurality of time domain unit sets or the at least one RV, and a plurality of second bit sequences are read from the circular buffer based on the at least one position offset factor.

As an example, after receiving a target transport block of the MAC layer, the physical layer of the terminal device first adds a CRC to the target transport block. After adding the CRC, if the number of bits contained in the target transport block exceeds a certain value, the target transport block needs to be divided into two or more code blocks with the same length. Each code block is added with a CRC. Then, LDPC encoding is independently performed on each code block with CRC added. That is, the first bit sequence of the target transport block after the LDPC encoding is obtained. Then, rate matching is performed on each encoded code block. That is, the first bit sequence is input to the circular buffer, and a plurality of second bit sequences are read from the circular buffer based on at least one RV and at least one position offset factor. Finally, the bit sequences are interleaved and sent to the network device.

Based on the above technical solution, by introducing the plurality of time domain unit sets or the at least one RV corresponding to the at least one position offset factor and reading a plurality of second bit sequences from the circular buffer based on the at least one position offset factor, the integrity of system bits can be guaranteed. That is to say, the method provided by the present disclosure can not only realize rate matching for a transport block in a TboMS, but also avoid losing the system bits corresponding to RV0 and/or RV1, so as to improve the decoding performance for the sequences after rate matching.

It should be noted that the time domain unit set(s) involved in the embodiments of the present disclosure can be a time domain resource set(s) for a transport block. For example, if the time domain resource of the transport block in the ThoMS corresponds to one transmission occasion or one transmission opportunity, the one transmission occasion or the one transmission opportunity includes the plurality of time domain unit sets. For another example, if the time domain resource of the transport block in the TboMS corresponds to a plurality of transmission occasions or transmission opportunities, the plurality of transmission occasions or transmission opportunities can respectively be the plurality of time domain unit sets. In addition, the "correspondence" referred to in the present disclosure can mean that there is a direct correspondence or an indirect correspondence relationship between the two, or can also mean that there is an association relationship between the two, or can also be a relationship between indication and being indicated, configuration and being configured, etc.

In some embodiments, the at least one RV includes one RV, the at least one position offset factor includes a plurality of position offset factors, and each of the plurality of time domain unit sets corresponds to a respective one of the plurality of position offset factors. The S230 may include following operations.

A plurality of first positions are determined in the circular buffer based on an identifier of the RV and the plurality of position offset factors. The plurality of first positions are respectively starting positions of the plurality of second bit sequences in the circular buffer. The plurality of second bit sequences are read from the circular buffer based on the at least one first position and E, and the E denotes a length of an output bit sequence of the target transport block after rate matching.

In other words, for each of the plurality of time domain unit sets, a position offset factor corresponding to the time domain unit set is introduced in the rate matching process to ensure the integrity of the system bits.

In some implementations, for each second bit sequence in the plurality of second bit sequences, the second bit sequence is read from the circular buffer in the following manner.

In a case that $d_{(k_0+j+Q_i)\bmod N_{cb}}$ is not equal to null, the $d_{(k_0+j+Q_i)\bmod N_{cb}}$ is determined as $e_k$.

In a case that the $d_{(k_0+j+Q_i)\bmod N_{cb}}$ is equal to null, a value of j is incremented by 1 until the $d_{(k_0+j+Q_i)\bmod N_{cb}}$ is not equal to null, and the $d_{(k_0+j+Q_i)\bmod N_{cb}}$ is determined as the $e_k$ in response to the $d_{(k_0+j+Q_i)\bmod N_{cb}}$ being not equal to null.

The $e_k$ denotes a value of a k-th bit in the second bit sequence, $k_0$ denotes a starting position of the RV in the circular buffer, an initial value of the j is 0, $Q_i$ denotes a position offset factor corresponding to an i-th time domain unit set in the plurality of time domain unit sets, and $N_{cb}$ denotes a length of the circular buffer.

In other words, reading the second bit sequence from the circular buffer may be implemented by the following code:

```
k=0;
j=0;
while k<E
    if d(k₀+j+Qi)modNcb ≠< NULL >
        ek = d(k₀+j+Qi)modNcb;
        k=k+1;
    end if
    j=j+1;
end while
```

Specifically, the if condition is used to determine whether the current bit is a Null bit, if the current bit is a Null bit, the current bit is skipped and then j++; and if the current bit is not a Null bit, the current bit is output, then k++ and then j++. The mod implements the circular buffer. It should be noted that the "Null" referred to in the present disclosure may be a padding bit introduced in the encoding process, or may be called an invalid bit, which is not specifically limited in the present disclosure.

In some implementations, the plurality of position offset factors are determined by a terminal device, or the plurality of position offset factors are indicated by a network device, or the plurality of position offset factors are predefined.

It should be noted that in the embodiments of the present disclosure, the "preset" can be realized by pre-storing corresponding codes, tables or other ways that can be available to indicate relevant information in devices (for example, including the terminal device and the network device), and the specific implementation manner thereof is not limited in the present disclosure. For example, the "preset" can refer to what is defined in the protocol. Alternatively, the "protocol" may refer to a standard protocol in the communication field, and may include, for example, an LTE protocol, an NR protocol, and related protocols applied in future communication systems, which are not specifically limited in the preset disclosure. In addition, it should be understood that the term "indication" referred to in the embodiments of the present disclosure may be a direct indication or an indirect indication or may represent an association. For example, A indicating B can mean that A directly indicates B, for example, B can be obtained through A. A indicating B can also mean that A indirectly indicates B, for example, A indicates C, and B can be obtained by C. A indicating B can also indicate that there is an association between A and B.

In some implementations, the method 200 may further include following operations.

A total number of bits available for transmission on all of time domain unit sets before an i-th time domain unit set in the plurality of time domain unit sets are determined as a position offset factor corresponding to the i-th time domain unit set.

In some implementations, the method 200 may further include following operations.

A number of bits available for transmission on each of the plurality of time domain unit sets is determined in the following manner.

A total number of resource elements (RE) available for uplink transmission on the time domain unit set is determined according to time-frequency resources corresponding to the time domain unit set.

The number of bits available for transmission on the time domain unit set is determined based on the total number of REs available for uplink transmission on the time domain unit set and a modulation order.

In some implementations, each of the plurality of time domain unit sets includes only one time domain unit, and a position offset factor corresponding to an i-th time domain unit set in the plurality of position offset factors is equal to i*M. An initial value of the i is 0 and the M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

In some implementations, each of the plurality of time domain unit sets includes at least one consecutive time domain unit, and a position offset factor corresponding to an i-th time domain unit set in the plurality of position offset factors is equal to $$\sum_{j=0}^{i-1}(n_j \cdot M).$$

An initial value of j is 0, $n_j$ denotes the number of time domain units included in the j-th time domain unit set, and M is an offset unit. Alternatively, a value of the M is determined by a terminal device, or a value of the M is indicated by a network device, or a value of the M is predefined.

The rate matching scheme provided by the present disclosure when at least one position offset factor corresponds to a plurality of time domain unit sets is described below in connection with specific embodiments.

First Embodiment

In this embodiment, rate matching is performed on the first bit sequence based on a single RV, each of the plurality of time domain unit sets corresponds to a respective one of a plurality of position offset factors, and each time domain unit set is a slot.

In other words, the rate matching of TBoMS takes slot as a unit. In the data transmission process of the TBoMS, a single RV (e.g., RV=0) is used for performing the rate matching. In order to enable a sequence corresponding to an RV to be consecutively mapped in a plurality of time domain unit sets (i.e., slots), it is considered to introduce a position offset factor for rate matching for each time domain unit set (i.e., slot).

In other words, reading the second bit sequence from the circular buffer may be implemented by the following code:

```
k=0;
j=0;
while k<E
    if d_(k0+j+Qi)modN_cb ≠< NULL >
        e_k= d_(k0+j+Qi)modN_cb;
        k=k+1;
    end if
    j=j+1;
end while
```

Tracking Reference Signal (TRS), Sounding Reference Signal (SRS) and Channel State Information (CSI) feedback and the like, the number of symbols available for transmission in the slot where TboMS is transmitted may be different. That is, the length of an output bit sequence after rate matching is different, so there is a certain complexity in calculating the actual offset factor. In an implementation manner, a total number of bits available for transmission on all time domain unit sets before an i-th time domain unit set in the plurality of time domain unit sets is determined as a position offset factor corresponding to the i-th time domain unit set. For example, the number of bits available for transmission on each of the plurality of time domain unit sets may be determined in the following manner. A total number of resource elements (RE) available for uplink transmission on the time domain unit set is determined according to time-frequency resources of the time domain unit set. The number of bits available for transmission on the time domain unit set is determined based on the total number of REs available for uplink transmission on the time domain unit set and a modulation order. In another implementation, each of the plurality of time domain unit sets includes only one time domain unit, and a position offset factor corresponding to an i-th time domain unit set in the plurality of position offset factors is equal to i*M. An initial value of the i is 0 and the M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

Figure 5:
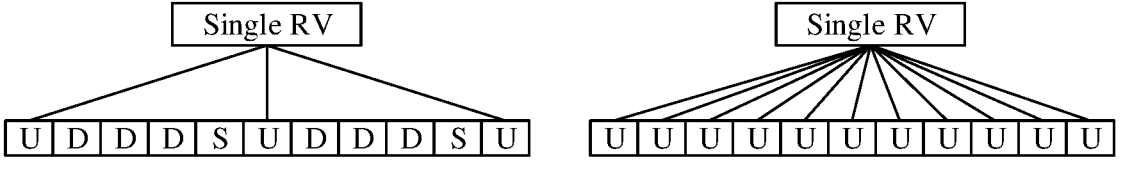
FIG. 5 is a schematic diagram of a plurality of time domain unit sets corresponding to at least one position offset factor provided by an embodiment of the present disclosure.

FIG. 5 is a schematic diagram of rate matching based on a single RV when a single slot is a time domain unit set provided by an embodiment of the present disclosure.

As shown in FIG. 5, for the left subgraph, there are three time domain unit sets (i.e., slots) that can be available for performing TBoMS transmission, and the three time domain unit sets can be respectively called a time domain unit set (i.e., slot) 0, a time domain unit set 1 and a time domain unit set 2, and position offset factors corresponding to the three time domain unit sets are a position offset factor 0, a position offset factor 1 and a position offset factor 2, respectively. Particularly, a value of the position offset factor 0 is equal to 0, a value of the position offset factor 1 is the number of bits actually transmitted in the time domain unit set 0, and a value of the position offset factor 2 is the number of bits actually transmitted in the time domain unit set 0 and in the time domain unit set 1. That is, a position offset factor i corresponding to a time domain unit set i is the total number of bits actually transmitted in the previous i−1 time domain unit sets. Similarly, for the right subgraph, there are 11 time domain unit sets (i.e., slots), each time domain unit set corresponds to a position offset factor, and the position offset factor i corresponding to the time domain unit set i is the total number of bits actually transmitted by the previous i−1 time domain unit sets.

Second Embodiment

In this embodiment, rate matching is performed on the first bit sequence based on a single RV, each of the plurality of time domain unit sets corresponds to a respective one of a plurality of position offset factors, and each time domain unit set is at least one consecutive slot.

In other words, the rate matching of TBoMS takes at least one consecutive slot as a unit. In the data transmission process of the TBoMS, a single RV (e.g., RV=0) is used for performing the rate matching. In order to enable a sequence corresponding to an RV to be consecutively mapped in a plurality of time domain unit sets (i.e., at least one consecutive slot), it is considered to introduce a position offset factor for rate matching for each time domain unit set (i.e., at least one consecutive slot).

In other words, reading the second bit sequence from the circular buffer may be implemented by the following code:

In other words, reading the second bit sequence from the circular buffer may be implemented by the following code:

```
k=0;
j=0;
while k<E
    if d_{(k_0+j+Q_i)modN_{cb}} ≠< NULL >
        e_k = d_{(k_0+j+Q_i)modN_{cb}};
        k=k+1;
    end if
    j=j+1;
end while
```

Due to the influence of TRS, SRS and the CSI feedback and the like, the number of time domain units included in the time domain unit set that is available for ThoMS transmission may be different, and the number of symbols available for transmission in the slot where TboMS is transmitted may also be different. That is, the length of an output bit sequence after rate matching is different, so there is a certain complexity in calculating the actual offset factor. In an implementation manner, a total number of bits available for transmission on all time domain unit sets before an i-th time domain unit set in the plurality of time domain unit sets is determined as a position offset factor corresponding to the i-th time domain unit set. For example, the number of bits available for transmission on each of the plurality of time domain unit sets may be determined in the following manner. A total number of resource elements (RE) available for uplink transmission on the time domain unit set is determined according to time-frequency resources in the time domain unit set. The number of bits available for transmission on the time domain unit set is determined based on the total number of REs available for uplink transmission on the time domain unit set and a modulation order. In another implementation, each of the plurality of time domain unit sets includes at least one consecutive time domain unit, and a position offset factor corresponding to an i-th time domain unit set in the plurality of position offset factors is equal to $$\sum_{j=0}^{i-1}(n_j \cdot M).$$

An initial value of j is 0, $n_j$ denotes the number of time domain units included in the j-th time domain unit set, and M is an offset unit. Alternatively, the M is an average value of a number of bits available for transmission on the plurality of time domain unit sets. Alternatively, a value of the M is determined by a terminal device, a value of the M is indicated by a network device, or a value of the M is predefined.

Figure 6:
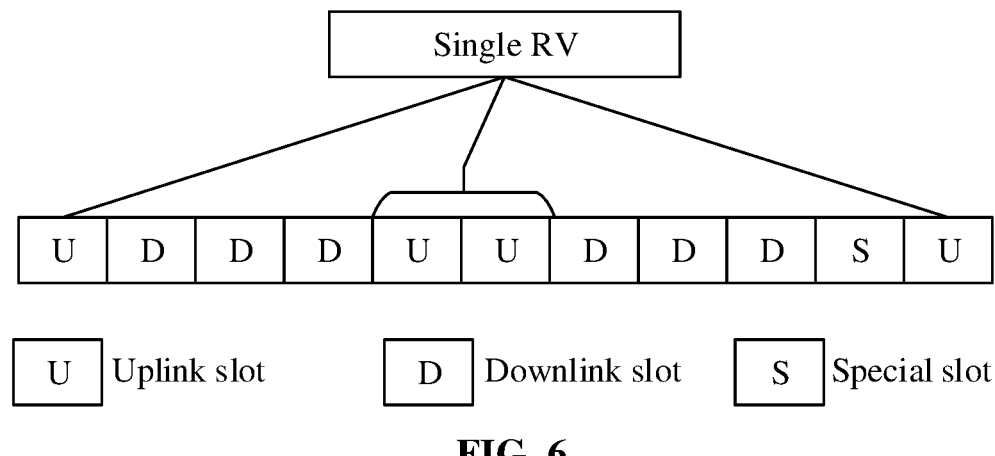
FIG. 6 is another schematic diagram of a plurality of time domain unit sets corresponding to at least one position offset factor provided by an embodiment of the present disclosure.

As shown in FIG. 6, assuming that there are three time domain unit sets (i.e., at least one consecutive slot) for performing TBoMS transmission, the three time domain unit sets can be respectively called a time domain unit set (i.e., at least one consecutive slot) 0, a time domain unit set 1 and a time domain unit set 2, and position offset factors corresponding to the three time domain unit sets are a position offset factor 0, a position offset factor 1 and a position offset factor 2, respectively. Each of the time domain unit set 0 and the time domain unit set 2 has only one slot, and the time domain unit set 1 has two slots. Particularly, a value of the position offset factor 0 is equal to 0, a value of the position offset factor 1 is the number of bits actually transmitted in the time domain unit set 0, and a value of the position offset factor 2 is the number of bits actually transmitted in the time domain unit set 0 and in the time domain unit set 1. That is, a position offset factor i corresponding to a time domain unit set i is the total number of bits actually transmitted by the previous i−1 time domain unit sets.

Third Embodiment

In this embodiment, rate matching is performed on the first bit sequence based on a single RV, each of the plurality of time domain unit sets corresponds to a respective one of a plurality of position offset factors, and each time domain unit set is at least one consecutive symbol.

In other words, the rate matching of TBoMS takes at least one consecutive symbol as a unit. In the data transmission process of the TBoMS, a single RV (e.g., RV=0) is used for performing the rate matching. In order to enable a sequence corresponding to an RV to be consecutively mapped in a plurality of time domain unit sets (i.e., at least one consecutive symbol), it is considered to introduce a position offset factor for rate matching for each time domain unit set (i.e., at least one consecutive symbol).

In other words, reading the second bit sequence from the circular buffer may be implemented by the following code:

```
k=0;
j=0;
while k<E
    if d_{(k_0+j+Q_i)modN_{cb}} ≠< NULL >
        e_k = d_{(k_0+j+Q_i)modN_{cb}};
        k=k+1;
    end if
    j=j+1;
end while
```

Due to the influence of the TDD frame structure, symbols available for the TBoMS transmission are not always consecutive. That is, the number of time domain units (i.e., symbols) included in the time domain unit set that is available for the TBoMS transmission may be different, so there is a certain complexity in calculating the actual offset factor.

In an implementation manner, a total number of bits available for transmission on all of time domain unit sets before an i-th time domain unit set in the plurality of time domain unit sets is determined as a position offset factor corresponding to the i-th time domain unit set. For example, the number of bits available for transmission on each of the plurality of time domain unit sets may be determined in the following manner. A total number of resource elements (RE) available for uplink transmission on the time domain unit set is determined according to time-frequency resources corresponding to the time domain unit set. The number of bits available for transmission on the time domain unit set is determined based on the total number of REs available for uplink transmission on the time domain unit set and a modulation order. In another implementation, each of the plurality of time domain unit sets includes at least one consecutive time domain unit, and a position offset factor corresponding to an i-th time domain unit set in the plurality of position offset factors is equal to $$\sum_{j=0}^{i-1}(n_j \cdot M).$$

An initial value of j is 0, $n_j$ denotes the number of time domain units included in the j-th time domain unit set, and M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

Figure 7:
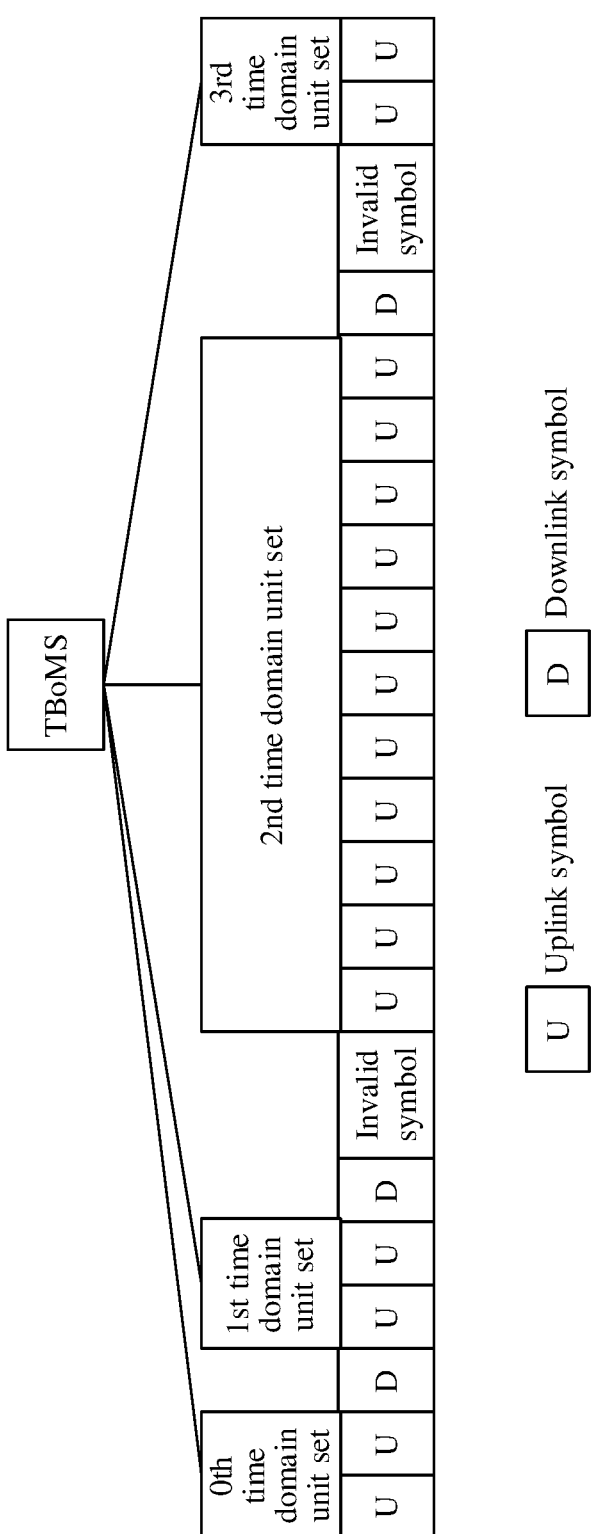
FIG. 7 is a yet another schematic diagram of a plurality of time domain unit sets corresponding to at least one position offset factor provided by an embodiment of the present disclosure.

FIG. 7 is a schematic diagram of rate matching based on a single RV when at least one consecutive symbol is a time domain unit set provided by an embodiment of the present disclosure.

As shown in FIG. 7, assuming that there are four time domain unit sets for performing TBoMS transmission, the four time domain unit sets can be respectively called a time domain unit set (i.e., at least one consecutive symbol) 0, a time domain unit set 1, a time domain unit set 2 and a time domain unit set 4, and position offset factors corresponding to the four time domain unit sets are a position offset factor 0, a position offset factor 1, a position offset factor 2 and a position offset factor 3, respectively. There are 4 transmission occasions for TBoMS (TOT). Particularly, a value of the position offset factor 0 is equal to 0, a value of the position offset factor 1 is the number of bits actually transmitted in the time domain unit set 0, and a value of the position offset factor 2 is the number of bits actually transmitted in the time domain unit set 0 and in the time domain unit set 1, and so on. That is, an offset i corresponding to a time domain unit set i is the total number of bits actually transmitted in the previous i−1 time domain unit sets.

In some embodiments, the at least one RV further includes a first RV, the first RV is an RV with an RV identifier of 1, and the at least one position offset factor is a first position offset factor corresponding to the first RV. The S230 may include following operations.

A second position is determined in the circular buffer based on the first position offset factor. The second position is a starting position of a second bit sequence corresponding to the first RV in the circular buffer. The second bit sequence corresponding to the first RV is read from the circular buffer based on the second position and E, and the E denotes a length of an output bit sequence of the target transport block after rate matching.

In other words, for the first RV, a first position offset factor corresponding to the first RV is introduced in the rate matching process to ensure the integrity of the system bits.

In some implementations, in a case that $d_{(j+Q_i) \bmod N_{cb}}$ is not equal to null, the $d_{(j+Q_i) \bmod N_{cb}}$ is determined as $e_k$.

In a case that the $d_{(j+Q_i) \bmod N_{cb}}$ is equal to null, a value of j is incremented by 1 until the $d_{(j+Q_i) \bmod N_{cb}}$ is not equal to null, and the $d_{(j+Q_i) \bmod N_{cb}}$ is determined as the $e_k$ in response to the $d_{(j+Q_i) \bmod N_{cb}}$ being not equal to null.

The $e_k$ denotes a value of a k-th bit in the second bit sequence corresponding to the first RV, an initial value of the j is 0, $Q_i$ denotes the first position offset factor and $N_{cb}$ denotes a length of the circular buffer.

In some implementations, the first position offset factor is equal to a total number of bits included in a second bit sequence corresponding to an RV with an RV identifier of 0.

In some implementations, the method 200 may further include following operations.

A total number of resource elements (RE) available for uplink transmission on a first time domain unit set is determined according to time-frequency resources corresponding to the first time domain unit set. The first time domain unit set is used for transmission of a second bit sequence corresponding to an RV with an RV identifier of 0.

A number of bits available for transmission on the first time domain unit set is determined based on the total number of REs available for uplink transmission on the first time domain unit set and a modulation order.

The number of bits available for transmission on the first time domain unit set is determined as the first position offset factor.

In some implementations, a first time domain unit set for transmission of the second bit sequence corresponding to the first RV includes only one time domain unit, and the first position offset factor is equal to M, and the M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

In some implementations, a first time domain unit set for transmission of the second bit sequence corresponding to the first RV includes a plurality of consecutive time domain units, and the first position offset factor is equal to $n_0 \cdot M$. The $n_0$ denotes the number of time domain units included in the first time domain unit set, the first time domain unit set is used for transmission of a second bit sequence corresponding to an RV with an RV identifier of 0, and the M is an offset unit. Alternatively, a value of the M is determined by a terminal device, or a value of the M is indicated by a network device, or a value of the M is predefined.

In some implementations, the plurality of RVs further include a second RV, the second RV is an RV with an RV identifier of 0, 2 or 3. The method 300 may further include following operations.

A third position is determined in the circular buffer based on the second RV.

A second bit sequence corresponding to the second RV from the circular buffer is determined based on the third position and the E, and the E denotes a length of an output bit sequence of the target transport block after rate matching.

In some implementations, in a case that $d_{(k_0+j)mod\ N_{cb}}$ is not equal to null, the $d_{(k_0+j)mod\ N_{cb}}$ is determined as $e_k$.

In a case that the $d_{(k_0+j)mod\ N_{cb}}$ is equal to null, a value of j is incremented by 1 until the $d_{(k_0+j)mod\ N_{cb}}$ is not equal to null, and the $d_{(k_0+j)mod\ N_{cb}}$ is determined as the $e_k$ in response to the $d_{(k_0+j)mod\ N_{cb}}$ being not equal to null.

The $e_k$ denotes a value of a k-th bit in the second bit sequence corresponding to the second RV, $k_0$ denotes a value of the third position, an initial value of j is 0 and $N_{cb}$ denotes a length of the circular buffer.

In other words, the first RV is an RV with an identifier of 1 and the second RV is an RV with an identifier of 0, 2 or 3. The second bit sequence corresponding to a respective RV can be read from the circular buffer based on the following code:

```
if RV=0,2,3
    k=0;
    j=0;
    while k<E
        if d(k0+j)modNcb ≠< NULL >
            ek = d(k0+j)modNcb;
            k=k+1;
        end if
        j=j+1;
    end while
else
    k=0;
    j=0;
    while k<E
        if d(j+Qi)modNcb ≠< NULL >
            ek = d(j+Qi)modNcb;
            k=k+1;
            end if
        j=j+1;
    end while
end if
```

In other words, the if condition is used to determine whether the current bit is a Null bit, if the current bit is a Null bit, the current bit is skipped and then j++; and if the current bit is not a Null bit, the current bit is output, then k++ and then j++. The mod implements the circular buffer. It should be noted that the "Null" referred to in the present disclosure may be a padding bit introduced in the encoding process, or may be called an invalid bit, which is not specifically limited in the present disclosure.

In some embodiments, the time domain unit set includes only one time domain unit or the time domain unit set includes at least one consecutive time domain unit. The time domain unit includes a slot or a symbol.

The solution provided by the present disclosure when at least one RV corresponds to at least one position offset factor is described below in connection with specific embodiments.

Fourth Embodiment

In this embodiment, rate matching is performed on the first bit sequence based on a plurality of RVs, the at least one RV corresponds to at least one position offset factor, and each time domain unit set is a slot.

In other words, the rate matching of TBoMS takes slot as a unit. In the data transmission process of the TBoMS, a plurality of RVs (e.g., RV=0) are used for performing the rate matching. In order to enable fully mapping of sequences corresponding to system bits, it is considered to introduce a first position offset factor for rate matching for the first RV (i.e., RV with an RV identifier of 1).

In other words, the first RV is an RV with an identifier of 1 and the second RV is an RV with an identifier of 0, 2 or 3. The second bit sequence corresponding to a respective RV can be read from the circular buffer based on the following code:

```
if RV=0,2,3
    k=0;
    j=0;
    while k<E
        if d(k0+j)modNcb ≠< NULL >
            ek = d(k0+j)modNcb;
            k=k+1;
        end if
        j=j+1;
    end while
else
    k=0;
    j=0;
    while k<E
        if d(j+Qi)modNcb ≠< NULL >
            ek = d(j+Qi)modNcb;
            k=k+1;
            end if
        j=j+1;
    end while
end if
```

The first position offset factor is equal to the total number of bits included in a second bit sequence corresponding to an RV with an RV identifier of 0. Due to the influence of TRS, SRS and CSI feedback and the like, the number of symbols available for transmission in the slot where TboMS is actually transmitted may also be different. That is, the length of an output bit sequence after rate matching is different, so there is a certain complexity in calculating the actual offset factor. In an implementation manner, a total number of resource elements (RE) available for uplink transmission on a first time domain unit set is determined according to time-frequency resources corresponding to the first time domain unit set. The first time domain unit set is used for transmission of a second bit sequence corresponding to an RV with an RV identifier of 0. A number of bits available for transmission on the first time domain unit set is determined based on the total number of REs available for uplink transmission on the first time domain unit set and a modulation order. The number of bits available for transmission on the first time domain unit set is determined as the first position offset factor. In some implementations, a first time domain unit set for transmission of the second bit sequence corresponding to the first RV includes only one time domain unit, and the first position offset factor is equal to M, and the M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

Figure 8:
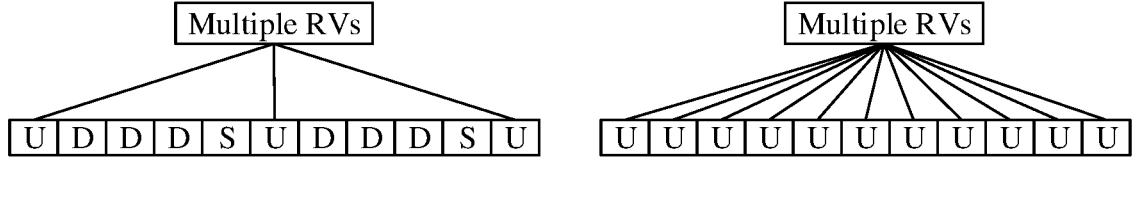
FIG. 8 is a schematic diagram of at least one RV corresponding to at least one position offset factor provided by an embodiment of the present disclosure.

FIG. 8 is a schematic diagram of rate matching based on a plurality of RVs when a single slot is a time domain unit set provided by an embodiment of the present disclosure.

As shown in FIG. 8, for the left subgraph, there are three time domain unit sets (i.e., slots) that can be available for performing TBoMS transmission, and the three time domain unit sets can be respectively called a time domain unit set (i.e., slot) 0, a time domain unit set 1 and a time domain unit set 2, and a first position offset factor for rate matching is introduced for a first RV (i.e., RV with an RV identifier of 1). In other words, the first position offset factor for rate matching is introduced for a first time domain unit set for transmission of a second bit sequence corresponding to an RV with an RV identifier of 0. A value of the first position offset factor is the number of bits for actual transmission of the RV with the RV identifier of 0. Similarly, for the right subgraph, there are 11 time domain unit sets (i.e., slots), and the first position offset factor for rate matching is introduced for the first RV (i.e., RV with the RV identifier of 1), and no position offset factor is introduced for an RV with an RV identifier of 0, 2 or 3.

Fifth Embodiment

In this embodiment, rate matching is performed on the first bit sequence based on a plurality of RVs, the at least one RV corresponds to at least one position offset factor, and each time domain unit set is at least one consecutive slot.

In other words, the rate matching of TBoMS takes at least one consecutive slot as a unit. In the data transmission process of the TBoMS, a plurality of RVs (e.g., RV=0) are used for performing the rate matching. In order to enable fully mapping of sequences corresponding to system bits, it is considered to introduce a first position offset factor for rate matching for the first RV (i.e., RV with an RV identifier of 1).

In other words, the first RV is an RV with an identifier of 1 and the second RV is an RV with an identifier of 0, 2 or 3. The second bit sequence corresponding to a respective RV can be read from the circular buffer based on the following code:

```
if RV=0,2,3
    k=0;
    j=0;
    while k<E
        if d_{(k_0+j)modN_cb} ≠< NULL >
            e_k = d_{(k_0+j)modN_cb};
            k=k+1;
        end if
        j=j+1;
    end while
else
    k=0;
    j=0;
    while k<E
        if d_{(j+Q_i)modN_cb} ≠< NULL >
            e_k = d_{(j+Q_i)modN_cb};
            k=k+1;
            end if
        j=j+1;
    end while
end if
```

Due to the influence of TRS, SRS and CSI feedback and the like, the number of time domain units included in the time domain unit set that is available for TBoMS transmission may be different, and the number of symbols available for transmission in the slot where TboMS is actually transmitted may also be different. That is, the length of an output bit sequence after rate matching is different, so there is a certain complexity in calculating the actual offset factor. In some implementations, a total number of resource elements (RE) available for uplink transmission on a first time domain unit set is determined according to time-frequency resources corresponding to the first time domain unit set. The first time domain unit set is used for transmission of a second bit sequence corresponding to an RV with an RV identifier of 0. A number of bits available for transmission on the first time domain unit set is determined based on the total number of REs available for uplink transmission on the first time domain unit set and a modulation order. The number of bits available for transmission on the first time domain unit set is determined as the first position offset factor. In some implementations, a first time domain unit set for transmission of the second bit sequence corresponding to the first RV includes a plurality of consecutive time domain units, and the first position offset factor is equal to $n_0 \cdot M$. The $n_0$ denotes the number of time domain units included in the first time domain unit set, the first time domain unit set is used for transmission of a second bit sequence corresponding to an RV with an RV identifier of 0, and the M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

Figure 9:
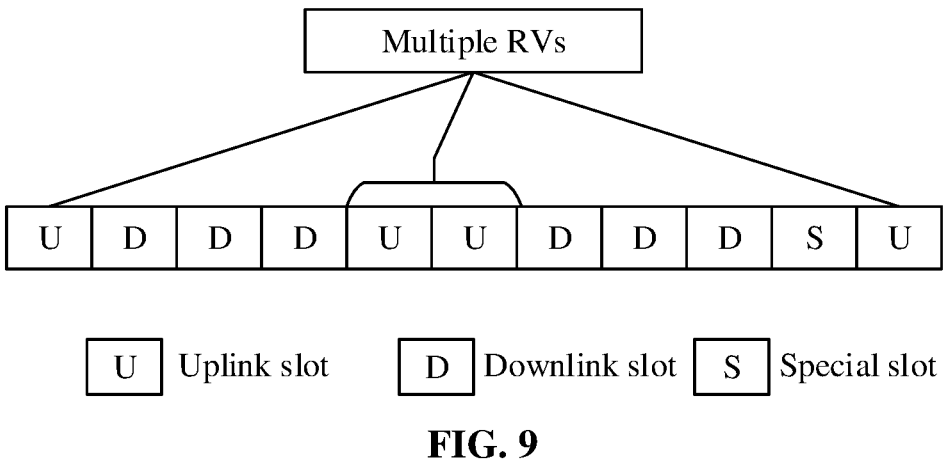
FIG. 9 is another schematic diagram of at least one RV corresponding to at least one position offset factor provided by an embodiment of the present disclosure.

FIG. 9 is a schematic diagram of rate matching based on a plurality of RVs when at least one consecutive slot is a time domain unit set provided by an embodiment of the present disclosure.

As shown in FIG. 9, assuming that there are three time domain unit sets (i.e., slots) for performing TBoMS transmission, the three time domain unit sets can be respectively called a time domain unit set (i.e., at least one consecutive slot) 0, a time domain unit set 1 and a time domain unit set 2, a first position offset factor for rate matching is introduced for a first RV (i.e., RV with an RV identifier of 1). In other words, the first position offset factor for rate matching is introduced for a first time domain unit set for transmission of a second bit sequence corresponding to an RV with an RV identifier of 0. A value of the first position offset factor is the number of bits for actual transmission of the RV with the RV identifier of 0.

Sixth Embodiment

In this embodiment, rate matching is performed on the first bit sequence based on a plurality of RVs, the at least one RV corresponds to at least one position offset factor, and each time domain unit set is at least one consecutive symbol.

In other words, the rate matching of TBoMS takes at least one consecutive symbol as a unit. In the data transmission process of the TBoMS, a plurality of RVs (e.g., RV=0) are used for performing the rate matching. In order to enable fully mapping of sequences corresponding to system bits, it is considered to introduce a first position offset factor for rate matching for the first RV (i.e., RV with an RV identifier of 1).

In other words, the first RV is an RV with an identifier of 1 and the second RV is an RV with an identifier of 0, 2 or 3. The second bit sequence corresponding to a respective RV can be read from the circular buffer based on the following code:

```
if RV=0,2,3
    k=0;
    j=0;
    while k<E
        if d_{(k_0+j)modN_cb} ≠< NULL >
            e_k = d_{(k_0+j)modN_cb};
            k=k+1;
        end if
        j=j+1;
    end while
else
    k=0;
```

-continued

```
        j=0;
        while k<E
            if d(j+Qi)modNcb ≠< NULL >
                ek = d(j+Qi)modNcb;
                k=k+1;
                end if
            j=j+1;
            end while
        end if
```

Due to the influence of TRS, SRS and CSI feedback and the like, the symbols that can be available for TBoMS transmission are not always consecutive, that is, the number of time domain units (i.e., symbols) included in the time domain unit set that can be available for the TBoMS transmission may be different, so there is a certain complexity in calculating the actual offset factor. In some implementations, a total number of resource elements (RE) available for uplink transmission on a first time domain unit set is determined according to time-frequency resources corresponding to the first time domain unit set. The first time domain unit set is used for transmission of a second bit sequence corresponding to an RV with an RV identifier of 0. The number of bits available for transmission on the first time domain unit set is determined based on the total number of REs available for uplink transmission on the first time domain unit set and a modulation order. The number of bits available for transmission on the first time domain unit set is determined as the first position offset factor. In some implementations, a first time domain unit set for transmission of the second bit sequence corresponding to the first RV includes a plurality of consecutive time domain units, and the first position offset factor is equal to $n_0 \cdot M$. The $n_0$ denotes the number of time domain units included in the first time domain unit set, the first time domain unit set is used for transmission of a second bit sequence corresponding to an RV with an RV identifier of 0, and the M is an offset unit. Alternatively, the M is an average value of a number of bits available for transmission on the plurality of time domain unit sets. Alternatively, a value of the M is determined by a terminal device, or a value of the M is indicated by a network device, or a value of the M is predefined.

Figure 10:
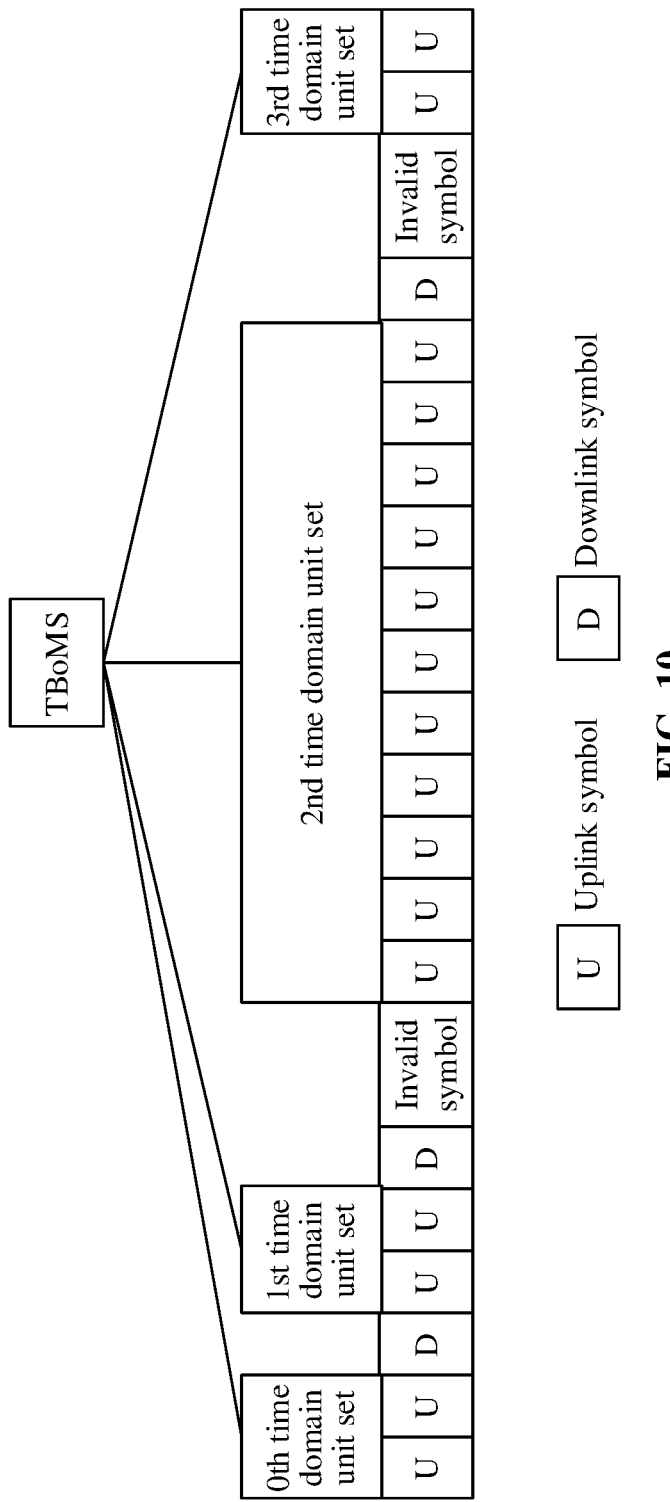
FIG. 10 is a yet another schematic diagram of at least one RV corresponding to at least one position offset factor provided by an embodiment of the present disclosure.

FIG. 10 is a schematic diagram of rate matching based on a plurality of RVs when at least one consecutive symbol is a time domain unit set provided by an embodiment of the present disclosure.

As shown in FIG. 10, assuming that there are four time domain unit sets for performing TBoMS transmission, the four time domain unit sets can be respectively called a time domain unit set (i.e., at least one consecutive symbol) 0, a time domain unit set 1, a time domain unit set 2 and a time domain unit set 4, a first position offset factor for the rate matching is introduced for a first RV (i.e., RV with an RV identifier of 1). In other words, the first position offset factor for rate matching is introduced for a first time domain unit set for transmission of a second bit sequence corresponding to an RV with an RV identifier of 0. A value of the first position offset factor is the number of bits for actual transmission of the RV with the RV identifier of 0.

Preferred embodiments of the present disclosure have been described in detail with reference to the accompanying drawings, but the present disclosure is not limited to the specific details of the above embodiments. Within the scope of the technical concept of the present disclosure, various simple variations can be made to the technical solution of the present disclosure, and these simple variations all belong to the scope of protection of the present disclosure. For example, each of the specific technical features described in the above specific embodiments may be combined in any suitable manner without contradiction, and various possible combinations are not further described in the present disclosure in order to avoid unnecessary repetition. For another example, any combination may be made among various embodiments of the present disclosure, and is likewise to be regarded as the content of the present disclosure so long as it does not depart from the idea of the present disclosure.

It should also be understood that in various method embodiments of the present disclosure, the magnitude of serial numbers of the above-mentioned processes does not mean the order of execution, and the execution order of the processes should be determined by their functions and inherent logic, and should not be defined in any way by the implementation process of the embodiments of the present disclosure. Further, in the embodiments of the present disclosure, terms "downlink" and "uplink" are used to represent a transmission direction of a signal or data. The "downlink" is used to represent a transmission direction of the signal or data being a first direction which means that the signal or data is transmitted from a site to user equipment of a cell, and the "uplink" is used to represent a transmission direction of the signal or data being a second direction which means that the signal or data is transmitted from the user equipment of the cell to the site. For example, a "downlink signal" means that a transmission direction of the signal is the first direction. In addition, in the embodiments of the present disclosure, the term "and/or" is merely an association relationship that describes associated objects, which means that there may be three relationships. Specifically, "A and/or B" may have three meanings: A exists alone, A and B exist at the same time and B exists alone. In addition, the character "/" herein generally indicates that the associated objects before and after the character "/" are in an "or" relationship.

The wireless communication method provided according to the embodiment of the present disclosure has been described in detail above from the perspective of the terminal device with reference to FIGS. 4 to 10, and the wireless communication method according to the embodiment of the present disclosure will be described below from the perspective of the network device with reference to FIG. 11.

FIG. 11 illustrates a schematic flowchart of a wireless communication method 300 according to an embodiment of the present disclosure. The method 300 may be performed by a network device such as the network device shown in FIG. 1.

As shown in FIG. 11, the method 300 may include following operations.

In S310, a plurality of second bit sequences are received respectively through a plurality of time domain unit sets.

In S320, the plurality of second bit sequences are decoded based on at least one redundancy version (RV) and at least one position offset factor to obtain a target transport block.

The at least one RV corresponds to at least one time domain unit set in the plurality of time domain unit sets, and the plurality of time domain unit sets or the at least one RV corresponds to the at least one position offset factor.

In some embodiments, the at least one RV includes one RV, the at least one position offset factor includes a plurality of position offset factors, and each of the plurality of time domain unit sets corresponds to a respective one of the plurality of position offset factors.

The S320 may include following operations.

Based on the RV, each of the plurality of second bit sequences are decoded by using the respective one of the plurality of position offset factors to obtain the target transport block.

In some embodiments, the plurality of position offset factors are determined by a terminal device, or the plurality of position offset factors are indicated by a network device, or the plurality of position offset factors are predefined.

In some embodiments, the method 300 may further include following operations.

A total number of bits available for transmission on all of time domain unit sets before an i-th time domain unit set in the plurality of time domain unit sets is determined as a position offset factor corresponding to the i-th time domain unit set.

In some embodiments, the method 300 may further include following operations.

A number of bits available for transmission on each of the plurality of time domain unit sets are determined in the following manner.

A total number of resource elements (RE) available for uplink transmission on the time domain unit set is determined according to time-frequency resources corresponding to the time domain unit set.

The number of bits available for transmission on the time domain unit set is determined based on the total number of REs available for uplink transmission on the time domain unit set and a modulation order.

In some embodiments, each of the plurality of time domain unit sets includes only one time domain unit, and a position offset factor corresponding to an i-th time domain unit set in the plurality of position offset factors is equal to i*M. An initial value of the i is 0 and the M is an offset unit.

In some embodiments, the M is an average value of a number of bits available for transmission on the plurality of time domain unit sets.

In some embodiments, each of the plurality of time domain unit sets includes at least one consecutive time domain unit, and a position offset factor corresponding to an i-th time domain unit set in the plurality of position offset factors is equal to $$\sum_{j=0}^{i-1}(n_j \cdot M).$$

An initial value of j is 0, $n_j$ denotes the number of time domain units included in a j-th time domain unit set, and the M is an offset unit.

In some embodiments, a value of the M is determined by a terminal device, or a value of the M is indicated by a network device, or a value of the M is predefined.

In some embodiments, the at least one RV further includes a first RV, the first RV is an RV with an RV identifier of 1, and the at least one position offset factor includes a first position offset factor corresponding to the first RV.

The S320 may include following operation.

Based on the first RV, a second bit sequence corresponding to the first RV is decoded by using the first position offset factor to obtain the target transport block.

In some embodiments, the first position offset factor is equal to a total number of bits included in a second bit sequence corresponding to an RV with an RV identifier of 0.

In some embodiments, the method 300 may further include following operations.

A total number of resource elements (RE) available for uplink transmission on the first time domain unit set is determined according to a time domain structure of the first time domain unit set. The first time domain unit set is used for transmission of a second bit sequence corresponding to an RV with an RV identifier of 0.

A number of bits available for transmission on the first time domain unit set is determined based on the total number of REs available for uplink transmission on the first time domain unit set and a modulation order.

The number of bits available for transmission on the first time domain unit set is determined as the first position offset factor.

In some embodiments, a first time domain unit set for transmission of the second bit sequence corresponding to the first RV includes only one time domain unit, and the first position offset factor is equal to M, where the M is an offset unit.

In some embodiments, the M is an average value of a number of bits available for transmission on the plurality of time domain unit sets.

In some embodiments, a first time domain unit set for transmission of the second bit sequence corresponding to the first RV includes a plurality of consecutive time domain units, and the first position offset factor is equal to $n_0 \cdot M$. The $n_0$ denotes the number of time domain units included in the first time domain unit set, and the first time domain unit set is used for transmission of a second bit sequence corresponding to an RV with an RV identifier of 0, where the M is an offset unit.

In some embodiments, a value of the M is determined by a network device, or a value of the M is indicated by a network device, or a value of the M is predefined.

In some embodiments, the plurality of RVs further include a second RV, the second RV is an RV with an RV identifier of 0, 2 or 3.

The method 300 may further include following operation.

Based on the second RV, a second bit sequence corresponding to the second RV is decoded to obtain the target transport block.

In some embodiments, the time domain unit set includes only one time domain unit, or the time domain unit set includes at least one consecutive time domain unit, and the time domain unit includes a slot or a symbol.

It should be understood that the operations in the method 300 may refer to the corresponding operations in the method 200. For example, the corresponding operations or solutions in the method 300 for determining the position offset factor and/or RV may refer to the corresponding operations or solutions in the method 200, and will not be repeated herein for brevity.

The method embodiments of the present disclosure are described in detail above with reference to FIGS. 1 to 11 and the apparatus embodiments of the present disclosure are described in detail below with reference to FIGS. 12 to 15.

Figure 12:
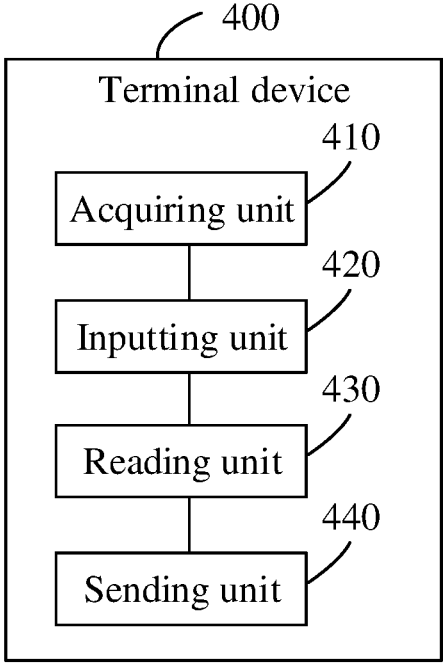
FIG. 12 is a schematic block diagram of a terminal device provided by an embodiment of the present disclosure.

FIG. 12 is a schematic block diagram of a terminal device 400 according to an embodiment of the present disclosure.

As shown in FIG. 12, the terminal device 400 may include an acquiring unit 410, an inputting unit 420, a reading unit 430, and a sending unit 440.

The acquiring unit 410 is configured to acquire a first bit sequence of a target transport block after being encoded. The target transport block is transmitted based on a plurality of time domain unit sets.

The inputting unit 420 is configured to input the first bit sequence to a circular buffer.

The reading unit 430 is configured to read a plurality of second bit sequences from the circular buffer based on at least one redundancy version (RV) and at least one position offset factor. The at least one RV corresponds to at least one time domain unit set in the plurality of time domain unit sets, and the plurality of time domain unit sets or the at least one RV corresponds to the at least one position offset factor.

The sending unit 440 is configured to send the plurality of second bit sequences respectively through the plurality of time domain unit sets.

In some embodiments, the at least one RV includes one RV, the at least one position offset factor includes a plurality of position offset factors, and each of the plurality of time domain unit sets corresponds to a respective one of the plurality of position offset factors.

The reading unit 430 is specifically configured to: determine a plurality of first positions in the circular buffer based on an identifier of the RV and the plurality of position offset factors. The plurality of first positions are respectively starting positions of the plurality of second bit sequences in the circular buffer; and read the plurality of second bit sequences from the circular buffer based on the at least one first position and E. The E denotes a length of an output bit sequence of the target transport block after rate matching.

In some embodiments, the reading unit 430 is specifically configured to: for each second bit sequence in the plurality of second bit sequences, read the second bit sequence from the circular buffer in the following manner: in a case that $d_{(k_0+j+Q_i)mod\ N_{cb}}$ is not equal to null, determining the $d_{(k_0+j+Q_i)mod\ N_{cb}}$ as $e_k$; in a case that the $d_{(k_0+j+Q_i)mod\ N_{cb}}$ is equal to null, increment a value of j by 1 until the $d_{(k_0+j+Q_i)mod\ N_{cb}}$ is not equal to null, and determining the $d_{(k_0+j+Q_i)mod\ N_{cb}}$ as the $e_k$ in response to the $d_{(k_0+j+Q_i)mod\ N_{cb}}$ being not equal to null.

The $e_k$ denotes a value of a k-th bit in the second bit sequence, $k_0$ denotes a starting position of the RV in the circular buffer, an initial value of the j is 0, $Q_i$ denotes a position offset factor corresponding to an i-th time domain unit set in the plurality of time domain unit sets, and $N_{cb}$ denotes a length of the circular buffer.

In some embodiments, the plurality of position offset factors are determined by a terminal device, or the plurality of position offset factors are indicated by a network device, or the plurality of position offset factors are predefined.

In some embodiments, the reading unit 430 is further configured to determine a total number of bits available for transmission on all of time domain unit sets before an i-th time domain unit set in the plurality of time domain unit sets as a position offset factor corresponding to the i-th time domain unit set.

In some embodiments, the reading unit 430 is further configured to determine the number of bits available for transmission on each of the plurality of time domain unit sets in the following manner: determining a total number of resource elements (RE) available for uplink transmission on the time domain unit set according to time-frequency resources corresponding to the time domain unit set; and determining the number of bits available for transmission on the time domain unit set based on the total number of REs available for uplink transmission on the time domain unit set and a modulation order.

In some embodiments, each of the plurality of time domain unit sets includes only one time domain unit, and a position offset factor corresponding to an i-th time domain unit set in the plurality of position offset factors is equal to i*M. An initial value of the i is 0 and the M is an offset unit.

In some embodiments, the M is an average value of a number of bits available for transmission on the plurality of time domain unit sets.

In some embodiments, each of the plurality of time domain unit sets includes at least one consecutive time domain unit, and a position offset factor corresponding to an i-th time domain unit set in the plurality of position offset factors is equal to $$\sum_{j}^{i-1}(n_j \cdot M).$$

An initial value of j is 0, $n_j$ denotes the number of time domain units included in a j-th time domain unit set, and M is an offset unit.

In some embodiments, a value of the M is determined by a terminal device, or the value of the M is indicated by a network device, or a value of the M is predefined.

In some embodiments, the at least one RV further includes a first RV, the first RV is an RV with an RV identifier of 1, and the at least one position offset factor includes a first position offset factor corresponding to the first RV.

The reading unit 430 is specifically configured to: determine a second position in the circular buffer based on the first position offset factor, the second position being a starting position of a second bit sequence corresponding to the first RV in the circular buffer; and read the second bit sequence corresponding to the first RV from the circular buffer based on the second position and E. The E denotes a length of an output bit sequence of the target transport block after rate matching.

In some embodiments, the reading unit 430 is specifically configured to: in a case that $d_{(j+Q_i)mod\ N_{cb}}$ is not equal to null, determine the $d_{(j+Q_i)mod\ N_{cb}}$ as $e_k$; and in a case that the $d_{(j+Q_i)mod\ N_{cb}}$ is equal to null, increment a value of j by 1 until the $d_{(j+Q_i)mod\ N_{cb}}$ is not equal to null, and determine the $d_{(j+Q_i)mod\ N_{cb}}$ as $e_k$ in response to the $d_{(j+Q_i)mod\ N_{cb}}$ being not equal to null.

The $e_k$ denotes a value of a k-th bit in the second bit sequence corresponding to the first RV, an initial value of the j is 0, $Q_i$ denotes the first position offset factor and $N_{cb}$ denotes a length of the circular buffer.

In some embodiments, the first position offset factor is equal to a total number of bits included in a second bit sequence corresponding to an RV with an RV identifier of 0.

In some embodiments, the reading unit 430 is further configured to: determine a total number of resource elements (RE) available for uplink transmission on a first time domain unit set according to time-frequency resources corresponding to the first time domain unit set, where first time domain unit set is used for transmission of a second bit sequence corresponding to an RV with an RV identifier of 0; determine the number of bits available for transmission on the first time domain unit set based on the total number of REs available for uplink transmission on the first time domain unit set and a modulation order; and determine the number of bits available for transmission on the first time domain unit set as the first position offset factor.

In some embodiments, a first time domain unit set for transmission of the second bit sequence corresponding to the first RV includes only one time domain unit, and the first position offset factor is equal to M, where the M is an offset unit.

In some embodiments, the M is an average value of the number of bits available for transmission on the plurality of time domain unit sets.

In some embodiments, a first time domain unit set for transmission of the second bit sequence corresponding to the first RV includes a plurality of consecutive time domain units, and the first position offset factor is equal to $n_0 \cdot M$. The $n_0$ denotes the number of time domain units included in the first time domain unit set, the first time domain unit set is used for transmission of a second bit sequence corresponding to an RV with an RV identifier of 0, and the M is an offset unit.

In some embodiments, a value of the M is determined by a terminal device, or a value of the M is indicated by a network device, or a value of the M is predefined.

In some embodiments, the plurality of RVs further include a second RV, the second RV is an RV with an RV identifier of 0, 2 or 3. The method further includes following operations.

A third position is determined in the circular buffer based on the second RV.

A second bit sequence corresponding to the second RV is read from the circular buffer based on the third position and the E. The E denotes a length of an output bit sequence of the target transport block after rate matching.

In some embodiments, the reading unit 430 is specifically configured to: in a case that $d_{(k_0+j) \bmod N_{cb}}$ is not equal to null, determine the $d_{(k_0+j) \bmod N_{cb}}$ as $e_k$; and in a case that the $d_{(k_0+j) \bmod N_{cb}}$ is equal to null, increment a value of j by 1 until the $d_{(k_0+j) \bmod N_{cb}}$ is not equal to null, and determine the $d_{(k_0+j) \bmod N_{cb}}$ as the $e_k$ in response to the $d_{(k_0+j) \bmod N_{cb}}$ being not equal to null.

The $e_k$ denotes a value of a k-th bit in the second bit sequence corresponding to the second RV, $k_0$ denotes a value of the third position, and an initial value of j is 0 and $N_{cb}$ denotes a length of the circular buffer.

In some embodiments, the time domain unit set includes only one time domain unit, or the time domain unit set includes at least one consecutive time domain unit, and the time domain unit includes a slot or a symbol.

It should be understood that the apparatus embodiments and the method embodiments may correspond to each other and similar descriptions may refer to the method embodiments. In particular, the terminal device 400 shown in FIG. 12 may correspond to a respective entity for performing the method 200 in the embodiments of the present disclosure, and the foregoing and other operations and/or functions of the various units in the terminal device 400 are respectively used to implement the corresponding flows in various methods in FIG. 4, which are not repeated herein for the sake of brevity.

Figure 13:
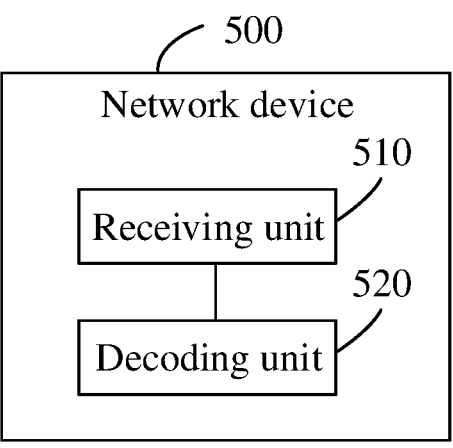
FIG. 13 is a schematic block diagram of a network device provided by an embodiment of the present disclosure.

FIG. 13 is a schematic block diagram of a network device 500 according to an embodiment of the present disclosure.

As shown in FIG. 13, the network device 500 may include a receiving unit 510, and a decoding unit 520.

The receiving unit 510 is configured to receive a plurality of second bit sequences respectively through a plurality of time domain unit sets.

The decoding unit 520 is configured to decode the plurality of second bit sequences based on at least one redundancy version (RV) and at least one position offset factor to obtain a target transport block.

The at least one RV corresponds to at least one time domain unit set in the plurality of time domain unit sets, and the plurality of time domain unit sets or the at least one RV corresponds to the at least one position offset factor.

In some embodiments, the at least one RV includes one RV, the at least one position offset factor includes a plurality of position offset factors, and each of the plurality of time domain unit sets corresponds to a respective one of the plurality of position offset factors.

The decoding unit 520 is specifically configured to: decode, based on the RV, each of the plurality of second bit sequences by using the respective one of the plurality of position offset factors to obtain the target transport block.

In some embodiments, the plurality of position offset factors are determined by a terminal device, or the plurality of position offset factors are indicated by a network device, or the plurality of position offset factors are predefined.

In some embodiments, the decoding unit 520 is further configured to: determine a total number of bits available for transmission on all of time domain unit sets before an i-th time domain unit set in the plurality of time domain unit sets as a position offset factor corresponding to the i-th time domain unit set.

In some embodiments, the decoding unit 520 is further configured to: determine a number of bits available for transmission on each of the plurality of time domain unit sets in the following manner: determining a total number of resource elements (RE) available for uplink transmission on the time domain unit set according to time-frequency resources corresponding to the time domain unit set; and determining the number of bits available for transmission on the time domain unit set based on the total number of REs available for uplink transmission on the time domain unit set and a modulation order.

In some embodiments, each of the plurality of time domain unit sets includes only one time domain unit, and a position offset factor corresponding to an i-th time domain unit set in the plurality of position offset factors is equal to i*M. An initial value of the i is 0 and the M is an offset unit.

In some embodiments, the M is an average value of a number of bits available for transmission on the plurality of time domain unit sets.

In some embodiments, each of the plurality of time domain unit sets includes at least one consecutive time domain unit, and a position offset factor corresponding to an i-th time domain unit set in the plurality of position offset factors is equal to $$\sum_{j}^{i-1}(n_j \cdot M).$$

An initial value of j is 0, $n_j$ denotes the number of time domain units included in a j-th time domain unit set, and the M is an offset unit.

In some embodiments, a value of the M is determined by a terminal device, a value of the M is indicated by a network device, or a value of the M is predefined.

In some embodiments, the at least one RV further includes a first RV, the first RV is an RV with an RV identifier of 1, and the at least one position offset factor includes a first position offset factor corresponding to the first RV.

The decoding unit 520 is specifically configured to decode, based on the first RV, a second bit sequence corresponding to the first RV by using the first position offset factor to obtain the target transport block.

In some embodiments, the first position offset factor is equal to a total number of bits included in a second bit sequence corresponding to an RV with an RV identifier of 0.

In some embodiments, the decoding unit 520 is further configured to: determine a total number of resource elements (RE) available for uplink transmission on the first time domain unit set according to a time domain structure of the first time domain unit set, herein the first time domain unit set is used for transmission of a second bit sequence corresponding to an RV with an RV identifier of 0; determine a number of bits available for transmission on the first time domain unit set based on the total number of REs available for uplink transmission on the first time domain unit set and a modulation order; and determine the number of bits available for transmission on the first time domain unit set as the first position offset factor.

In some embodiments, a first time domain unit set for transmission of the second bit sequence corresponding to the first RV includes only one time domain unit, the first position offset factor is equal to M, and the M is an offset unit.

In some embodiments, the M is an average value of a number of bits available for transmission on the plurality of time domain unit sets.

In some embodiments, a first time domain unit set for transmission of the second bit sequence corresponding to the first RV includes a plurality of consecutive time domain units, and the first position offset factor is equal to $n_0 \cdot M$. The $n_0$ denotes the number of time domain units included in the first time domain unit set, the first time domain unit set is used for transmission of a second bit sequence corresponding to an RV with an RV identifier of 0, and the M is an offset unit.

In some embodiments, a value of the M is determined by a network device, or a value of the M is indicated by a network device, or a value of the M is predefined.

In some embodiments, the plurality of RVs further include a second RV, and the second RV is an RV with an RV identifier of 0, 2 or 3.

The decoding unit 520 is further configured to: decode, based on the second RV, a second bit sequence corresponding to the second RV to obtain the target transport block.

In some embodiments, the time domain unit set includes only one time domain unit, or the time domain unit set includes at least one consecutive time domain unit, and the time domain unit includes a slot or a symbol.

It should be understood that apparatus embodiments and method embodiments may correspond to each other and thus similar descriptions for the apparatus embodiments may refer to the method embodiments. In particular, the network device 500 shown in FIG. 13 may correspond to a respective entity for performing the method 300 in the embodiments of the present disclosure, and the foregoing and other operations and/or functions of various units in the network device 500 that respectively implement corresponding flows in various methods in FIG. 11 are not repeated herein for the sake of brevity.

The communication device of the embodiments of the present disclosure is described above from the perspective of functional modules with reference to the accompanying drawings. It should be understood that the functional modules may be implemented in hardware form, the functional modules may be implemented by instructions in software form, or the functional modules may be implemented by a combination of hardware and software modules. In particular, various operations of the method embodiments in the embodiments of the present disclosure can be completed by an integrated logic circuit of the hardware in a processor and/or instructions in the software form, and the operations of the method disclosed in combination with the embodiments of the present disclosure can be directly embodied as being performed by a hardware decoding processor or performed by a combination of hardware and software modules in a decoding processor. Alternatively, the software module may be located in a Random Access Memory (RAM), a flash memory, a read only memory, a programmable read-only memory, an electrically erasable programmable memory, a register and other storage media mature in the art. The storage medium is located in the memory, and the processor reads information in the memory and completes the operations in the method embodiments in combination with its hardware.

For example, the acquiring unit 410, the inputting unit 420, the reading unit 440 and the decoding unit 520 as mentioned above may be implemented by a processor and the sending unit 440 and the receiving unit 510 as mentioned above may be implemented by a transceiver.

Figure 14:
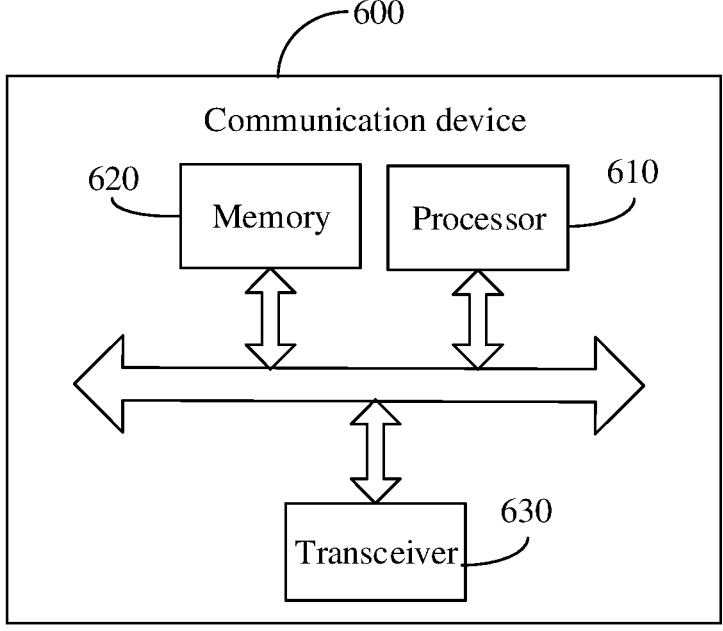
FIG. 14 is a schematic block diagram of a communication device provided by an embodiment of the present disclosure.

FIG. 14 is a schematic structural diagram of a communication device 600 according to an embodiment of the present disclosure.

As shown in FIG. 14, the communication device 600 may include a processor 610.

The processor 610 may invoke and run a computer program from a memory to perform the method in the embodiments of the present disclosure.

As shown in FIG. 14, the communication device 600 may further include a memory 620.

The memory 620 may be configured to store indication information and may also be used to store codes, instructions and the like that are executed by the processor 610. The processor 610 may invoke and run a computer program from the memory 620 to perform the method in the embodiments of the present disclosure. The memory 620 may be a separate device independent of the processor 610 or may be integrated within the processor 610.

As shown in FIG. 14, the communication device 600 may further include a transceiver 630.

The processor 610 may control the transceiver 630 to communicate with other devices and in particular may transmit information or data to other devices or may receive information or data transmitted by other devices. The transceiver 630 may include a transmitter and a receiver. The transceiver 630 may further include antennas, the number of which may be one or more.

It should be understood that various components in the communication device 600 are connected by a bus system. The bus system includes a power bus, a control bus and a status signal bus in addition to a data bus.

It should also be understood that the communication device 600 may be a terminal device according to embodiments of the present disclosure, and the communication device 600 may implement corresponding flows implemented by the terminal device in various methods of the embodiments of the present disclosure. That is, the communication device 600 of the embodiments of the present disclosure may correspond to the terminal device 400 in the embodiments of the present disclosure, and may correspond to a respective entity for performing the method 200 according to the embodiments of the present disclosure, which will not be repeated herein for the sake of brevity. Similarly, the communication device 600 may be a network device of embodiments of the present disclosure and the communication device 600 may implement corresponding flows implemented by the network device in various methods of the embodiments of the present disclosure. That is, the communication device 600 of the embodiments of the present disclosure may correspond to the network device 500 of the embodiments of the present disclosure and may correspond to a respective entity for performing the method 300 according to the embodiment of the present disclosure, which will not be repeated herein for the sake of brevity.

In addition, an embodiment of the present disclosure further provides a chip.

For example, the chip may be an integrated circuit chip having signal processing capabilities and may implement or perform methods, operations and logic diagrams disclosed in the embodiments of the present disclosure. The chip may also be referred to as a system-level chip, a system chip, a chip system or a chip-on system, etc. Alternatively, the chip can be applied to various communication devices, so that the communication devices mounted with the chip can perform the methods, operations and logic block diagrams disclosed in the embodiments of the present disclosure.

Figure 15:
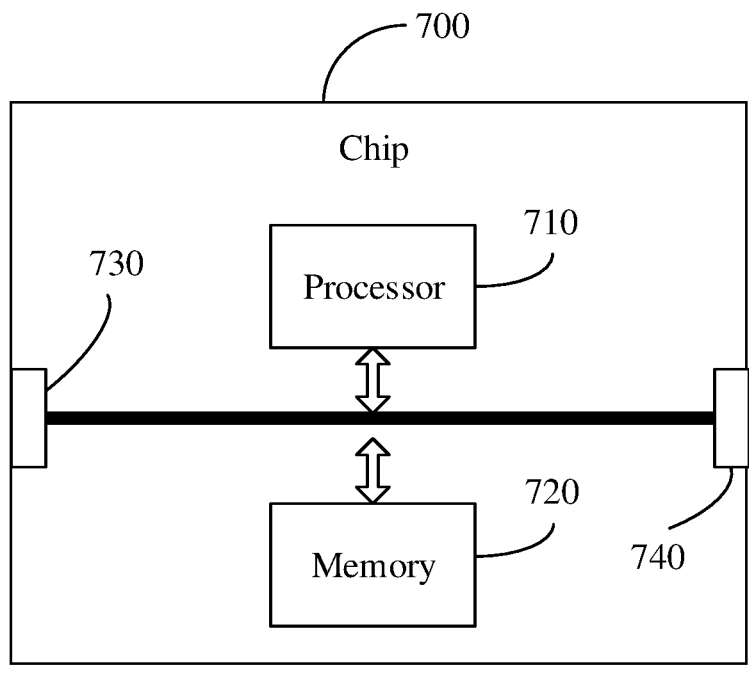
FIG. 15 is a schematic block diagram of a chip provided by an embodiment of the present disclosure.

FIG. 15 is a schematic structural diagram of a chip 700 according to an embodiment of the present disclosure.

As shown in FIG. 15, the chip 700 includes a processor 710.

The processor 710 may invoke and run a computer program from a memory to perform the method in the embodiments of the present disclosure.

As shown in FIG. 15, the chip 700 may further include a memory 720.

The processor 710 may invoke and run a computer program from the memory 720 to perform the method in the embodiments of the present disclosure. The memory 720 may be configured to store indication information and may also be configured to store codes, instructions and the like that are executed by the processor 710. The memory 720 may be a separate device independent of the processor 710 or may be integrated within the processor 710.

As shown in FIG. 15, the chip 700 may further include an input interface 730.

The processor 710 may control the input interface 730 to communicate with other devices or chips and in particular may obtain information or data transmitted by other devices or chips.

As shown in FIG. 15, the chip 700 may further include an output interface 740.

The processor 710 may control the output interface 740 to communicate with other devices or chips and in particular may output information or data to other devices or chips.

It should be understood that the chip 700 may be applied to the network device in the embodiments of the present disclosure, and the chip may implement the corresponding flows implemented by the network device in various methods of the embodiments of the present disclosure, and may also implement the corresponding flows implemented by the terminal device in various methods of the embodiments of the present disclosure, which will not be repeated herein for the sake of brevity.

It should also be understood that respective components in the chip 700 are connected by a bus system. The bus system includes a power bus, a control bus and a status signal bus in addition to a data bus.

The processors referred to above may include, but are not limited to general purpose processors, Digital Signal Processors (DSP), Application Specific Integrated Circuits (ASIC), Field Programmable Gate Arrays (FPGA) or other programmable logic devices, discrete gates or transistor logic devices, discrete hardware components and so on.

The processor may be configured to implement or perform the methods, operations, and logic diagrams disclosed in the embodiments of the present disclosure. The operations of the method disclosed in combination with the embodiments of the present disclosure can be directly embodied as the execution of the hardware decoding processor or the combined execution of the hardware and software modules in the decoding processor. The software module may be located in a random access memory, a flash memory, a read only memory, a programmable read only memory or an erasable programmable memory, a register and other storage media mature in the art. The storage medium is located in the memory, and the processor reads information in the memory and completes the operations in the method in combination with its hardware.

The memory referred to above includes, but is not limited to a volatile memory and/or a nonvolatile memory. The nonvolatile memory may be a Read-Only Memory (ROM), a Programmable ROM (PROM), an Erasable PROM (EPROM), an Electrically Erasable EPROM (EEPROM), or a flash memory. The volatile memory may be a Random Access Memory (RAM) which serves as an external cache. By way of illustration, but not limitation, many forms of RAM are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a synchronous link DRAM (SL-DRAM), and a direct Rambus RAM (DR RAM).

It should be noted that the memory described herein is intended to include these and any other suitable types of memory.

An embodiment of the present disclosure further provides a computer readable storage medium for storing computer programs. The computer readable storage medium stores one or more programs including instructions that, when executed by a portable electronic device which includes a plurality of application programs, cause the portable electronic device to perform the method of the embodiments of the method 200 or the method 300. Alternatively, the computer readable storage medium can be applied to the network device in the embodiments of the present disclosure, and the computer program causes the computer to execute the corresponding flows implemented by the network device in various methods of the embodiments of the present disclosure, which will not be repeated herein for the sake of brevity. Alternatively, the computer readable storage medium can be applied to the mobile terminal/terminal device in the embodiments of the present disclosure, and the computer programs cause the computer to execute corresponding flows implemented by the mobile terminal/terminal device in various methods of the embodiments of the present disclosure, which will not be repeated herein for the sake of brevity.

An embodiment of the present disclosure further provides a computer program product, which includes a computer program. Alternatively, the computer program product may be applied to the network device in the embodiments of the present disclosure, and the computer program causes the computer to execute the corresponding flows implemented by the network device in various methods of the embodiments of the present disclosure, which will not be repeated herein for the sake of brevity. Alternatively, the computer program product may be applied to the mobile terminal/terminal device in the embodiments of the present disclosure, and the computer program causes the computer to execute the corresponding flows implemented by the mobile terminal/terminal device in various methods of the embodiments of the present disclosure, which will not be repeated herein for the sake of brevity.

An embodiment of the present disclosure further provides a computer program. The computer program, when executed by a computer, causes the computer to execute the methods of the embodiments of the method 200 or the method 300. Alternatively, the computer program can be applied to the network device in the embodiments of the present disclosure, and the computer program, when running on a computer, causes the computer to execute the corresponding flows implemented by the network device in various methods of the embodiments of the present disclosure, which will not be repeated herein for the sake of brevity. Alternatively, the computer program can be applied to the mobile terminal/terminal device in the embodiments of the present disclosure, and the computer program, when running on the computer, causes the computer to execute the corresponding flows implemented by the mobile terminal/terminal device in various methods of the embodiments of the present disclosure, which will not be repeated herein for the sake of brevity.

An embodiment of the present disclosure further provides a communication system, which may include the terminal device and the network device mentioned above to form the communication system 100 as shown in FIG. 1, which will not be repeated herein for the sake of brevity. It should be noted that the term "system" herein can also be referred to as "network management architecture" or "network system".

It should also be understood that terms used in the embodiments of the present disclosure and the appended claims are for the purpose of describing specific embodiments only and are not intended to limit the embodiments of the present disclosure. For example, the singular forms of "a/an", "said", "described" and "the" used in the embodiments of the present disclosure and the appended claims are also intended to include plural forms, unless the context clearly indicates other meanings.

Those skilled in the art may be aware that the units and algorithm operations of the various examples described in the embodiments disclosed herein may be implemented by electronic hardware or a combination of computer software and electronic hardware. Whether these functions are executed by hardware or software depends on the specific application and design constraints of the technical solutions. Professionals and technicians can use different methods to implement the described functions of each specific application, but such implementation should not be considered beyond the scope of the present disclosure. If the functions are implemented in the form of software functional units and are sold or used as an independent product, it can be stored in a computer readable storage medium. Based on such an understanding, the technical solutions of the disclosure or the part that contributes to the related art or the part of the technical solutions may be embodied in the form of a software product essentially, and the computer software product is stored in a storage medium including several indications to enable a computer device (which may be a personal computer, a server or a network device, etc.) to execute all or part of the operations of the methods described in various embodiment of the disclosure. The aforementioned storage medium includes: U disks, mobile hard disks, read-only memories (ROM), random access memories (RAM), magnetic disks or optical disks and other media that can store program codes.

Those skilled in the art may also be aware that for specific working processes of the above-described systems, apparatuses and units, reference may be made to corresponding flows in the foregoing method embodiments and will not be repeated herein for convenience and brevity of description. In several embodiments provided by the present disclosure, it should be understood that the disclosed systems, apparatuses and methods may be implemented in other ways. For example, the partition of units, modules or components in the above-described apparatus embodiments is only a logical functional partition, which may be implemented in other ways. For example, multiple units, modules or components may be combined or integrated into another system, or some units, modules or components may be ignored or not executed. For another example, the units, modules or components described above as separate or displayed components may or may not be physically separated. That is, these units, modules or components may be located in one place, or may be distributed over a plurality of network units. Some or all of the units, modules or components may be selected according to actual needs to achieve the object of the embodiments of the present disclosure. Finally, it should be noted that the displayed or discussed mutual coupling, direct coupling or communication connection may be indirect coupling or communication connection through some interfaces, apparatuses or units, and may be in electrical, mechanical or other forms.

The foregoing are only specific implementations of the embodiments of the present disclosure, but the protection scope of the embodiments of the present disclosure is not limited thereto. Any variations or replacements apparent to those skilled in the art within the technical scope disclosed by the present disclosure shall fall within the protection scope of the present disclosure. Therefore, the protection scope of the embodiments of the present disclosure shall be defined by the protection scope of the claims.

The invention claimed is:

1. A wireless communication method, comprising:

acquiring a first bit sequence of a target transport block after being encoded, wherein the target transport block is transmitted based on a plurality of time domain unit sets;

inputting the first bit sequence into a circular buffer;

reading a plurality of second bit sequences from the circular buffer based on at least one redundancy version (RV) and at least one position offset factor, wherein the at least one RV corresponds to at least one time domain unit set in the plurality of time domain unit sets, and the plurality of time domain unit sets or the at least one RV corresponds to the at least one position offset factor; and sending the plurality of second bit sequences respectively through the plurality of time domain unit sets.

2. The method of claim 1, wherein the at least one RV comprises one RV, the at least one position offset factor comprises a plurality of position offset factors, and each of the plurality of time domain unit sets corresponds to a respective one of the plurality of position offset factors, wherein reading the plurality of second bit sequences from the circular buffer based on the at least one RV and the at least one position offset factor, comprises:

determining a plurality of first positions in the circular buffer based on an identifier of the RV and the plurality of position offset factors, wherein the plurality of first positions are respectively starting positions of the plurality of second bit sequences in the circular buffer; and reading the plurality of second bit sequences from the circular buffer based on the at least one first position and E, wherein the E denotes a length of an output bit sequence of the target transport block after rate matching.

3. The method of claim 2, wherein reading the plurality of second bit sequences from the circular buffer based on the at least one first position and the E, comprises:

for each second bit sequence in the plurality of second bit sequences, reading the second bit sequence from the circular buffer in the following manner:

in a case that $d_{(k_0+j+Q_i)mod\ N_{cb}}$ is not null, determining the $d_{(k_0+j+Q_i)mod\ N_{cb}}$ as $e_k$; and in a case that the $d_{(k_0+j+Q_i)mod\ N_{cb}}$ is null, incrementing a value of j by 1 until the $d_{(k_0+j+Q_i)mod\ N_{cb}}$ is not null, and determining the $d_{(k_0+j+Q_i)mod\ N_{cb}}$ as the $e_k$ in response to the $d_{(k_0+j+Q_i)mod\ N_{cb}}$ being not null, wherein the $e_k$ denotes a value of a k-th bit in the second bit sequence, $k_0$ denotes a starting position of the RV in the circular buffer, an initial value of the j is 0, $Q_i$ denotes a position offset factor corresponding to an i-th time domain unit set in the plurality of time domain unit sets, and $N_{cb}$ denotes a length of the circular buffer.

4. The method of claim 2, wherein each of the plurality of time domain unit sets comprises only one time domain unit, and a position offset factor corresponding to an i-th time domain unit set in the plurality of position offset factors is equal to i*M, wherein an initial value of the i is 0 and the M is an offset unit, wherein the M is an average value of a number of bits available for transmission on the plurality of time domain unit sets, or, wherein each of the plurality of time domain unit sets comprises at least one consecutive time domain unit, and a position offset factor corresponding to an i-th time domain unit set in the plurality of position offset factors is equal to $$\sum_{j}^{i-1}(n_j \cdot M),$$

wherein an initial value of j is 0, $n_j$ denotes a number of time domain units comprised in a j-th time domain unit set, and M is an offset unit.

5. The method of claim 1, wherein the at least one RV further comprises a first RV, the first RV being an RV with an RV identifier of 1, and the at least one position offset factor comprises a first position offset factor corresponding to the first RV, wherein reading the plurality of second bit sequences from the circular buffer based on the at least one RV and the at least one position offset factor, comprises:

determining a second position in the circular buffer based on the first position offset factor, wherein the second position is a starting position of a second bit sequence corresponding to the first RV in the circular buffer; and reading the second bit sequence corresponding to the first RV from the circular buffer based on the second position and E, wherein the E denotes a length of an output bit sequence of the target transport block after rate matching.

6. The method of claim 5, wherein a first time domain unit set for transmission of the second bit sequence corresponding to the first RV comprises only one time domain unit, and the first position offset factor is equal to M, wherein the M is an offset unit, wherein the M is an average value of a number of bits available for transmission on the plurality of time domain unit sets, or wherein a first time domain unit set for transmission of the second bit sequence corresponding to the first RV comprises a plurality of consecutive time domain units, and the first position offset factor is equal to $n_0 \cdot M$, wherein $n_0$ denotes a number of time domain units comprised in the first time domain unit set, the first time domain unit set is used for transmission of a second bit sequence corresponding to an RV with an RV identifier of 0, and the M is an offset unit.

7. The method of claim 5, wherein the plurality of RVs further comprise a second RV, the second RV being an RV with an RV identifier of 0, 2 or 3, and the method further comprises:

determining a third position in the circular buffer based on the second RV; and reading a second bit sequence corresponding to the second RV from the circular buffer based on the third position and the E, wherein the E denotes a length of an output bit sequence of the target transport block after rate matching.

8. A terminal device, comprising:

a processor, configured to acquire a first bit sequence of a target transport block after being encoded, wherein the target transport block is transmitted based on a plurality of time domain unit sets; input the first bit sequence into a circular buffer; and read a plurality of second bit sequences from the circular buffer based on at least one redundancy version (RV) and at least one position offset factor, wherein the at least one RV corresponds to at least one time domain unit set in the plurality of time domain unit sets, and the plurality of time domain unit sets or the at least one RV corresponds to the at least one position offset factor; and a transceiver, configured to send the plurality of second bit sequences respectively through the plurality of time domain unit sets.

9. The terminal device of claim 8, wherein the at least one RV comprises one RV, the at least one position offset factor comprises a plurality of position offset factors, and each of the plurality of time domain unit sets corresponds to a respective one of the plurality of position offset factors, wherein the processor is specifically configured to:

determine a plurality of first positions in the circular buffer based on an identifier of the RV and the plurality of position offset factors, wherein the plurality of first positions are respectively starting positions of the plurality of second bit sequences in the circular buffer; and read the plurality of second bit sequences from the circular buffer based on the at least one first position and E, wherein the E denotes a length of an output bit sequence of the target transport block after rate matching.

10. The terminal device of claim 9, wherein the processor is specifically configured to:

for each second bit sequence in the plurality of second bit sequences, read the second bit sequence from the circular buffer in the following manner:

in a case that $d_{(k_0+j+Q_i)mod\ N_{cb}}$ is not null, determine the $d_{(k_0+j+Q_i)mod\ N_{cb}}$ as $e_k$; and in a case that the $d_{(k_0+j+Q_i)mod\ N_{cb}}$ is null, increment a value of j by 1 until the $d_{(k_0+j+Q_i)mod\ N_{cb}}$ is not null, and determining the $d_{(k_0+j+Q_i)mod\ N_{cb}}$ as the $e_k$ in response to the $d_{(k_0+j+Q_i)mod\ N_{cb}}$ being not null, wherein the $e_k$ denotes a value of a k-th bit in the second bit sequence, $k_0$ denotes a starting position of the RV in the circular buffer, an initial value of the j is 0, $Q_i$ denotes a position offset factor corresponding to an i-th time domain unit set in the plurality of time domain unit sets, and $N_{cb}$ denotes a length of the circular buffer.

11. The terminal device of claim 8, wherein the at least one RV further comprises a first RV, the first RV being an RV with an RV identifier of 1, and the at least one position offset factor comprises a first position offset factor corresponding to the first RV, wherein the processor is specifically configured to:

determine a second position in the circular buffer based on the first position offset factor, wherein the second position is a starting position of a second bit sequence corresponding to the first RV in the circular buffer; and read the second bit sequence corresponding to the first RV from the circular buffer based on the second position and E, wherein the E denotes a length of an output bit sequence of the target transport block after rate matching.

\*   \*   \*   \*   \*